United States Patent [19]

Egusa et al.

[11] Patent Number: 4,927,589
[45] Date of Patent: May 22, 1990

[54] METHOD FOR MANUFACTURING ORGANIC THIN FILM

[75] Inventors: Syun Egusa, Yokohama; Akira Miura, Toride; Nobuhiro Gemma, Yokohama, all of Japan

[73] Assignee: Kabushiki Kaisha Toshiba, Kawasaki, Japan

[21] Appl. No.: 287,281

[22] Filed: Dec. 21, 1988

[30] Foreign Application Priority Data

Mar. 16, 1988 [JP] Japan ................................. 63-62263
Sep. 20, 1988 [JP] Japan ................................. 63-235301

[51] Int. Cl.⁵ ..................... B29C 39/04; B29C 39/12; B05D 1/20
[52] U.S. Cl. ................................. 264/259; 118/402; 118/423; 264/40.2; 264/40.7; 264/298; 425/150; 425/171; 425/224; 427/402; 427/407.2; 427/409; 427/434.3
[58] Field of Search .................. 427/434.3, 402, 430.1, 427/409, 407.2; 118/402, 423, 425; 264/259, 298, 40.7, 40.2; 425/224, 150, 171

[56] References Cited

U.S. PATENT DOCUMENTS

| | | | |
|---|---|---|---|
| 4,279,855 | 7/1981 | Ward, III | 264/298 |
| 4,511,604 | 4/1985 | Barraud et al. | 427/434.3 |
| 4,533,307 | 8/1985 | Ansorge | 425/224 |
| 4,674,436 | 6/1987 | Miyazaki et al. | 118/402 |
| 4,716,851 | 1/1988 | Saito et al. | 427/434.3 |
| 4,801,476 | 1/1989 | Densmuir et al. | 427/434.3 |

FOREIGN PATENT DOCUMENTS

| | | | |
|---|---|---|---|
| 145585 | 6/1985 | European Pat. Off. | 118/402 |
| 200287 | 11/1986 | European Pat. Off. | 264/298 |
| 59-22724 | 2/1984 | Japan | 264/298 |

OTHER PUBLICATIONS

Nippon Kagaku Kaishi (Chemical Society of Japan), vol. 1987, No. 12, pp. 2330–2337; H. Kumchara, S. Miyata; Dec. 1987.

*Primary Examiner*—Jeffery Thurlow
*Assistant Examiner*—Mathieu Vargot
*Attorney, Agent, or Firm*—Oblon, Spivak, McClelland, Maier & Neustadt

[57] ABSTRACT

A film manufacturing method which utilizes a trough storing a liquid therein. The liquid surface of the liquid forms a developing region in which a monomolecular film of organic molecules is developed. The developed monomolecular film is compressed by a barrier to a predetermined surface pressure. A workpiece having a build-up surface is moved by a vertical moving mechanism in a direction perpendicular to the developing region through the monomolecular film while being moved ahead of the build-up surface in a horizontal direction by a horizontal moving mechanism, so that the monomolecular film is built up on the build-up surface.

9 Claims, 17 Drawing Sheets

METHOD FOR MANUFACTURING ORGANIC THIN FILM

BACKGROUND OF THE INVENTION

1. Field of the Invention

The present invention relates to a method for manufacturing organic thin films having a uniform structure and free from defects, based on the Langmuir-Blodgett technique.

2. Description of the Related Art

In recent years, electrical elements utilizing an organic thin film manufactured by the Langmuir-Blodgett technique (to be referred as the LB technique hereinafter) have been developed and studied. In order to apply an organic thin film manufactured by the LB technique to an electrical element, it is important to manufacture a built-up film having a uniform structure and free from defects.

A conventional film manufacturing apparatus for an organic thin film by the LB technique basically comprises a trough for forming a liquid surface on which a monomolecular film is to be developed, a barrier for compressing the developed monomolecular film, a drive device for the barrier, and a surface pressure balance for detecting a surface pressure of the monomolecular film. The apparatus includes two types of apparatus, i.e., an apparatus which has one barrier and moves the barrier in one direction, and an apparatus which has two barriers, and moves the barriers in two directions. When organic thin films are manufactured based on the LB technique using the above-mentioned apparatus, organic molecules are dissolved in a developing solution such as chloroform, and the solution is dripped and developed drop by drop on the liquid surface of the trough by an injector. The molecules developed on the liquid surface are compressed by driving the barrier. In this case, the surface pressure of the monomolecular film is monitored by the surface pressure balance as a surface molecular density of the monomolecular film, and the monomolecular film is compressed to obtain predetermined surface pressure $\pi$. Then, a substrate is moved perpendicularly to the liquid surface on which the monomolecular film is developed, so that the developed monomolecular film is transferred and built up onto the substrate.

Since the surface pressure balance for detecting the compressed state of the monomolecular film on the liquid surface, the substrate on which the monomolecular films are built up, and the barrier for compressing the monomolecular film are displaced from each other, problems occur. More specifically, when the monomolecular films are built up on the substrate, the monomolecular film on the liquid surface is decreased near the substrate, and the surface pressure is also decreased. The conventional film manufacturing apparatus is operated under the assumption that a decrease in surface pressure upon building-up of the monomolecular film is immediately transmitted to the entire monomolecular film is averaged, and is detected by the surface pressure balance. Thus, the barrier is moved in a compression direction until the monomolecular film recovers the predetermined surface pressure. With this operation, the building-up operation of the monomolecular film is assumed to be performed constantly at the predetermined surface pressure.

However, molecules which can exhibit properties according to the above assumption are only limited ones such as aliphatic molecules. In contrast to this, since monomolecular films formed of molecules such as dye-containing molecules and macromolecules exhibit large viscosity, a decrease in surface pressure of the monomolecular film near the substrate is not always immediately transmitted to the surface pressure balance separate from the substrate. The viscosity of the monomolecular film developed on the liquid surface means propagation, relaxation characteristics of a stress (surface pressure) generated when a given surface strain acts on the monomolecular film. More specifically, the viscosity of the monomolecular film delays propagation time of a change in surface pressure to the surface pressure balance. Therefore, when the building-up operation of dye-containing molecules or macromolecules is continued based on the surface pressure detected by the surface pressure balance, the surface density of the monomolecular film near the substrate is continuously decreased. As a result, the density of the monomolecular film built up on the substrate is not constant, and a built-up film having a uniform structure free from defects cannot be obtained. In order to transfer the monomolecular film on the liquid surface onto the substrate, the surface pressure of the monomolecular film must be equal to or higher than a given value. This value varies depending on types of molecules, hydrophilic and hydrophobic properties and moving directions of the substrate. Therefore, under a given condition, the monomolecular film may be able to be successfully built up but may not be built up if the condition changes.

Furthermore, when the barrier, substrate, and surface balance are arranged separate from each other, molecules radially flow from a portion around the substrate toward the substrate. For this reason, even if building-up of the monomolecular film is possible, nonuniformity of molecules occur along the boundary between the substrate and the monomolecular film, and a uniform monomolecular film cannot be obtained.

In order to prevent nonuniformity of the molecular density distribution in the conventional apparatus, the building-up rate of the monomolecular film may be sufficiently decreased so as to eliminate the influence of the viscosity of the monomolecular film, i.e., so as to accurately transmit the surface pressure of the monomolecular film near the substrate to the surface pressure balance. However, with this method, it takes a long period of time i.e. 10 to 1,000 times the existing method, and this method cannot be put into practical applications.

SUMMARY OF THE INVENTION

The present invention has been made to solve the above problem, and has as its object to provide a method and apparatus for manufacturing organic thin films having a uniform structure and free from defects within a short period of time.

In order to achieve the above object, a method according to the present invention comprises the steps of preparing a liquid surface for forming a developing region on which a monomolecular film of organic molecules can be developed; developing the monomolecular film of the organic molecules in the developing region; compressing the developed monomolecular film to a predetermined surface pressure; and moving a workpiece having a build-up surface through the developed monomolecular film in a direction perpendicular to the monomolecular film while moving the workpiece ahead of the build-up surface in a horizontal direction, thereby building up the monomolecular film on the build-up surface.

A film formation apparatus according to the present invention comprises a trough for storing a liquid, the trough having a liquid surface for forming a developing region on which a monomolecular film of organic molecules is developed; compression means for compressing the developed monomolecular film to a predetermined surface pressure; vertical moving means for moving a workpiece in a direction perpendicular to the monomolecular film; horizontal moving means for moving the workpiece ahead of a build-up surface thereof in a horizontal direction; and drive means for driving the vertical and horizontal moving means so that the workpiece is moved in the horizontal direction while being moved upward or downward in the vertical direction through the developed monomolecular film, thereby building up the monomolecular film on the build-up surface.

According to the present invention, the building-up operation is performed without causing a surface strain due to a decrease in surface pressure of the monomolecular film. The principle of the present invention will be described below.

According to the present invention, a monomolecular film developed in the developing region is compressed to a predetermined surface pressure by the compression means such as a barrier. However, according to the present invention, since the monomolecular film can be compressed by moving a workpiece in a direction parallel to the monomolecular film, the compression operation of the barrier need not always be performed. After the monomolecular film is compressed to the predetermined surface pressure, the workpiece is moved forward at a predetermined horizontal moving speed while being moved downward through the monomolecular film. Thus, a first monomolecular film can be built up on the build-up surface of the workpiece. Subsequently, the workpiece is moved forward at the predetermined horizontal moving speed while being moved upward through the monomolecular film, thereby building up a second monomolecular film on the build-up surface. Note that when the vertical movement of the workpiece is switched from downward movement to the upward movement and viceversa, the horizontal movement is stopped, and the substrate is moved by a few millimeters in a state wherein the area of the liquid surface is left unchanged. In this case, no monomolecular film is built up on the substrate, and only a meniscal wave formed by the substrate and the liquid surface is changed. The above operation is repeated to form nlayered built-up films on the build-up surface of the workpiece.

As described above, during the building-up operation of the monomolecular film, the workpiece is moved in a direction parallel to the monomolecular film, so that the workpiece is moved in a direction for compressing the monomolecular film. Therefore, a decrease in surface pressure of the monomolecular film near the workpiece, which is caused when the monomolecular film is transferred to the build-up surface of the workpiece, can be prevented. As a result, no surface strain of the monomolecular film occurs, and a built-up film having a uniform structure free from defects can be obtained.

It is preferable that the building-up operation of the monomolecular film is performed in a state wherein the flow of molecules is regulated so that the monomolecular film does not flow into that region of the developing region through which the workpiece has passed. In this case, the flow of molecules relative to the build-up surface of the workpiece during the building-up operation becomes parallel toward the build-up surface. For this reason, neither sparse nor dense regions are generated in the flow of molecules, and a built-up film having a uniform structure can be more easily obtained. According to an embodiment of the present invention, an elongated developing region having the same width as that of the workpiece is defined by a pair of parallel spacers or a pair of parallel strings, and the building-up operation of the monomolecular film is performed while the developing region is partitioned by the workpiece into front and rear regions with respect to the workpiece. It is preferable that the width of the developing region is not fixed but may be desirably changed in accordance with the width of various workpieces.

The horizontal moving speed of the workpiece is a speed for moving the workpiece forward within the developing region be an area corresponding to the number of molecules of a film built up on the build-up surface per unit time by the vertical movement of the workpiece. More specifically, the horizontal moving speed is determined to maintain the surface molecular density of the monomolecular film ahead of the build-up surface of the workpiece constant, and the determination method includes a forced method and a surface pressure method.

In the forced method, a build-up ratio of the monomolecular film is preset, and the horizontal moving speed is obtained by multiplying the vertical moving speed with the build-up ratio. The build-up ratio is a ratio of an area of the build-up surface, passing through the monomolecular film when the workpiece is vertically moved, to the number of molecules built up on the build-up surface. For example, when the build-up ratio is 1, the horizontal moving speed of the workpiece is equal to the upward/downward speed, and the workpiece is moved in an oblique direction of 45 degrees. In order to avoid trouble that a monomolecular film cannot be built up on the build-up surface of the workpiece and the surface pressure of the monomolecular film is abnormally increased, the building-up operation is preferably performed while monitoring the surface pressure of the monomolecular film using a surface pressure balance.

In the surface pressure method, the pressure acting on the workpiece is detected, and the horizontal moving speed of the workpiece is determined based on the detected pressure. For example, when an elongated developing region having the same width as the workpiece is defined and is partitioned by the workpiece into front and rear regions with respect to the workpiece, as described above, if a surface pressure of the monomolecular film developed in the front region of the workpiece is given as $\pi 1$ and that of the monomolecular film developed on the rear region is given as $\pi 2$, the workpiece receives a pressure difference of $\Delta \pi = \pi 1 - \pi 2$ from the front region toward the rear region. Therefore, if a pressure difference detecting section for detecting $\Delta \pi$ is coupled to the workpiece and the horizontal moving speed of the workpiece is controlled so that $\Delta \pi$ becomes a predetermined value, an ideal building-up operation can be performed with any build-up ratio.

When the surface pressure method is used, a film can be formed in various modes, and pressure differences to be detected are as follows. For example, if a monomolecular film to be built up is developed and compressed on the front region ahead of the workpiece and no molecules are developed in the rear region ($\pi 2=0$), then $\Delta\pi=\pi 1$. If a monomolecular film to be built up is developed in the front region and a monomolecular film having a low viscosity is developed in the rear region and compressed to yield $\pi 2=\pi 1$, then $\Delta\pi=0$. Note that in the latter case, if the workpiece is arranged to be freely movable forward/backward along the molecule developing region to a position yielding $\Delta\pi=0$, the absolute value of the pressure difference acting on the workpiece need not always be detected.

According to the present invention, the workpiece can have a function of detecting a surface pressure of the developed monomolecular film and a function of compressing the monomolecular film. Therefore, the compression operation of the monomolecular film can be performed while controlling a molecular density near the workpiece. For this reason, even when the entire developed monomolecular film is not compressed to a predetermined surface pressure, the building-up operation can be started as soon as only the surface pressure near the workpiece reaches a desired value. Therefore, it is possible to build up molecules which have a large viscosity and may often be difficult to obtain a compressed film having a constant surface pressure, within a short period of time.

BRIEF DESCRIPTION OF THE DRAWINGS

FIGS. 1 to 4 show a film manufacturing apparatus according to a first embodiment of the present invention, in which FIG. 1 is a perspective view showing the overall apparatus, FIG. 2 is a plan view schematically showing the apparatus, and FIGS. 3 and 4 are views schematically showing building-up processes of a monomolecular film;

FIGS. 6 to 8 show a film manufacturing apparatus according to a third embodiment of the present invention, in which FIG. 6 is a side view of the apparatus, FIG. 7 is a plan view of the apparatus, and FIG. 8 is a perspective view of a holder;

FIGS. 9 to 12 show a film manufacturing apparatus according to a fourth embodiment of the present invention, in which FIG. 9 is a side view of the apparatus, FIG. 10 is a plan view of the apparatus, FIG. 11 is a view schematically showing a compressed state of a developed monomolecular film, and FIG. 12 is a graph showing the compressed state;

FIGS. 13 to 19 show a fifth embodiment of the present invention, in which FIGS. 13 and 14 are side views showing contact angles between a substrate and a liquid surface during upward and downward movements of the substrate, respectively, FIG. 17 is a perspective view showing a film manufacturing apparatus according to the fifth embodiment, and FIGS. 18 and 19 are a side view and a front view of a building-up mechanism;

FIGS. 20 to 22 show a film manufacturing apparatus according to a sixth embodiment of the present invention, in which FIG. 20 is a perspective view showing the overall apparatus, and FIGS. 21 and 22 are a side view and a front view of a building-up mechanism.

DESCRIPTION OF THE PREFERRED EMBODIMENTS

Embodiments of the present invention will now be described with reference to the accompanying drawings.

Figure 1:
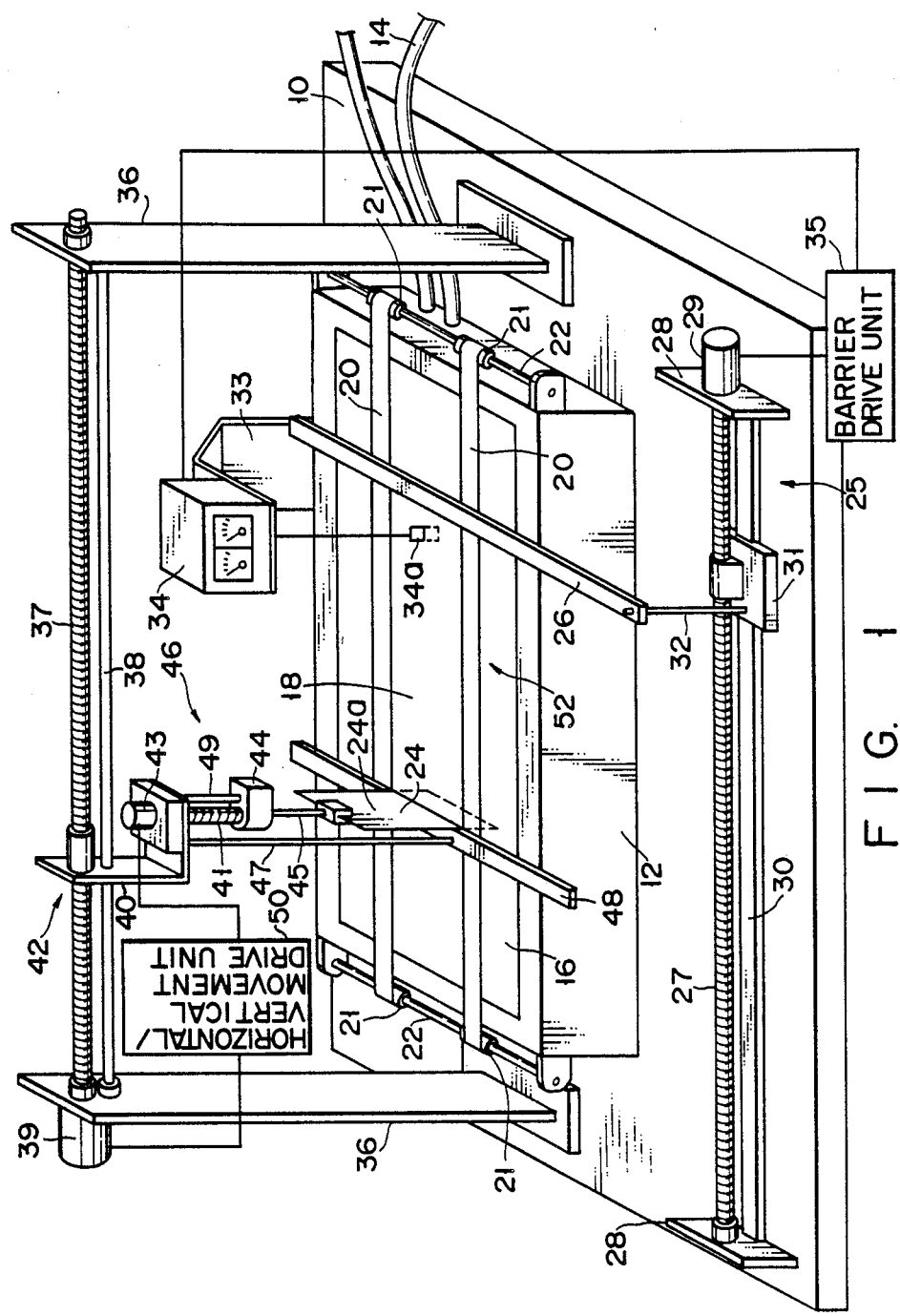

FIG. 1 shows a film manufacturing apparatus according to a first embodiment of the present invention. The apparatus comprises a base 10 on which trough 12 having a rectangular opening is placed. The inner surface of trough 12 is Teflon-coated and has a water jacket. Constant-temperature water 16 can be supplied into trough 12 through water-supply pipe 14 which is connected to the water jacket, and water 16 can be maintained at a predetermined temperature. The liquid surface of isothermal water 16 stored in trough 12 forms developing region 18 on which a monomolecular film (to be described later) can be developed. A pair of parallel spacers 20 formed of a Teflon tape are arranged above trough 12 to be in contact with the liquid surface of water 16, and extend in the longitudinal direction of the trough. Two ends of each spacer 20 are fixed to corresponding rollers 21. Rollers 21 are mounted on corresponding guide rods 22, which are fixed to the side walls of trough 12, to be movable in the axial direction of the rods. These guide rods 22 extend in a direction perpendicular to spacers 20. Therefore, the pair of spacers 20 are movable in a direction closer to or separate from each other. Developing region 18 is partitioned by spacers 20 into an elongated rectangular shape having the same width as the distance between the spacers. By adjusting the distance between spacers 20, the width of developing region 18 is set to be equal to that of substrate 24 serving as a workpiece (to be described later).

Front barrier 26 of an elongated flat plate is placed on one end portion of trough 12, and is in contact with the liquid surface of water 16. Barrier 26 extends in a direction perpendicular to spacers 20, and its two end portions extend outwardly from trough 12. Lead screw 27 is arranged outside trough 12, and extends parallel to spacers 20, i.e., in the longitudinal direction of the trough. Two ends of the screw are rotatably supported by a pair of support plates 28 fixed on base 10. Pulse motor 29 for rotating lead screw 27 is mounted on one supporting plate 28. Guide rail 30 is arranged between the pair of supporting plates 28 and extends parallel to lead screw 27. Moving table 31 is engaged with lead screw 27 and guide rail 30 and movable in their axial directions. Table 31 is coupled to one end of front barrier 26 through arm 32. Thus, when pulse motor 29 is driven, barrier 26 is moved in the longitudinal direction of trough 12 and compresses a monomolecular film developed in developing region 18 defined between spacers 20, as will be described later. Pulse motor 29, lead screw 27, guide rail 30, moving table 31, and arm 32 constitute barrier moving mechanism 25.

Surface pressure balance 34 supported on supporting plate 33 is arranged above developing region 18. Balance 34 has filter paper 34a dipped in developing region 18 and measures the surface pressure of a monomolecular film developed in the developing region. Pulse motor 29 is controlled by barrier drive unit 35 based on the surface pressure measured by balance 34.

A pair of supporting columns 36 stand upright on base 10 and are located at two sides of trough 12. Lead screw 37 and guide rod 38 extend between columns 36 and extend parallel to spacers 20 above developing region 18. Horizontal movement pulse motor 39 for rotating lead screw 37 is attached to one supporting column 36. Moving table 40 is engaged with lead screw 37 and guide rod 38. Thus, when motor 39 is driven, table 40 is moved in the axial direction of lead screw 37, i.e., a horizontal direction. Lead screw 37, guide rod 38, pulse motor 39, and moving table 40 constitute horizontal moving mechanism 42 for moving substrate 24 in the horizontal direction.

Lead screw 41 and guide rod 49 extend downward from moving table 40 in a direction perpendicular to developing region 18. Vertical movement pulse motor 43 for rotating lead screw 41 is fixed to table 40. Moving table 44 is engaged with lead screw 41 and guide rod 49. When pulse motor 43 is driven, table 44 is moved in the vertical direction. Rectangular substrate 24 serving as a work is supported by table 44 through supporting arm 45. Lead screw 41, guide rod 49, pulse motor 43, and moving table 44 constitute vertical moving mechanism 46 for moving substrate 24 upward/downward in a direction perpendicular to developing region 18.

Elongated planar rear barrier 48 formed of Teflon is supported by moving table 44 through supporting arm 47 and extends in a direction perpendicular to spacers 20. Barrier 48 is in contact with the liquid surface of water 16 stored in trough 12 and is also in contact with the rear surface of substrate 24. Barrier 48 is moved in the axial direction of spacers 20 together with moving table 44.

The operations of horizontal and vertical pulse motors 39 and 43 are controlled by horizontal/vertical movement drive unit 50. Drive unit 50 stores therein a contact position between substrate 24 and developing region 18. Unit 50 has a function of stopping rotation of pulse motor 43 when substrate 24 falls outside the developing region upon vertical movement of substrate 24. Substrate 24 is horizontally moved while being moved in a direction perpendicular to developing region 18 (i.e., moved upward or downward) by horizontal and vertical moving mechanisms 42 and 46 and drive unit 50. Simultaneously, rear barrier 48 is horizontally moved while being in contact with the rear surface of substrate 24. In particular, when substrate 24 separates from developing region 18, rear barrier 48 prevents a monomolecular film from leaking to the liquid surface behind the substrate.

An LB film is formed as follows using the abovementioned film manufacturing apparatus.

Figure 2:
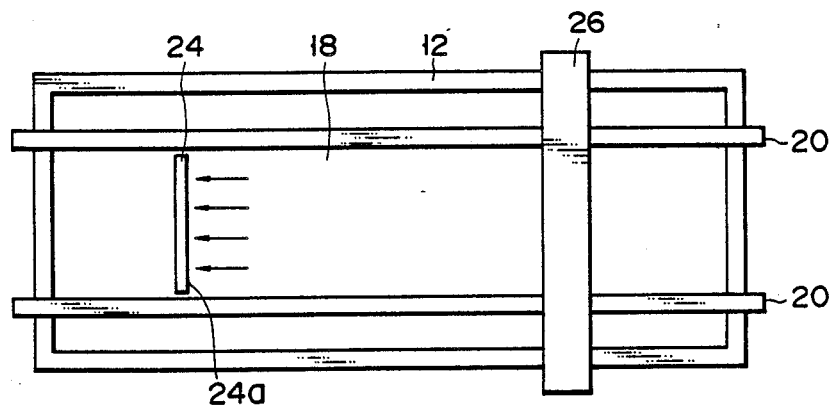

The distance between spacers 20 is adjusted while substrate 24 is not dipped in water 16, thereby defining developing region 18 having the same width as that of substrate 24. In this state, organic molecules are developed in the region partitioned by the pair of spacers 20, and front and rear barriers 26 and 48. Then, front barrier 26 is moved toward rear barrier 48 to compress a monomolecular film of organic molecules. In this case, when the output from surface pressure balance 34 indicates a value smaller than predetermined surface pressure $\pi$, drive unit 35 moves front barrier 26 forward in the compressing direction at a constant speed. When the output from balance 34 coincides with predetermined surface pressure $\pi$, unit 35 stops the forward movement of the front barrier. Thereafter, unit 35 moves front barrier 26 forward or backward so that the output from balance 34 is kept at predetermined surface pressure $\pi$. Then, substrate 24 is dipped in developing region 18. At this time, as can be seen from FIG. 2, substrate 24 is dipped so that its front surface, i.e., build-up surface 24a extends in a direction perpendicular to the longitudinal direction of spacers 20. For this reason, the two side edges of substrate 24 are substantially in contact with corresponding spacers 20. In this embodiment, substrate 24 is positioned so that its build-up surface 24a extends in a direction perpendicular to developing region 18.

Figure 3:
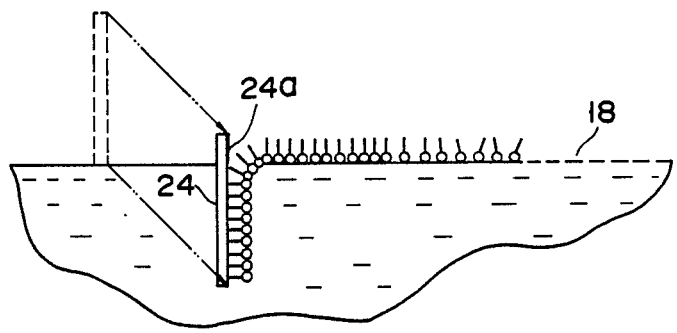
Figure 4:
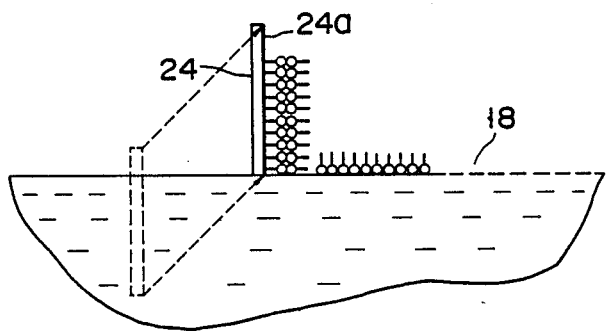

In this state, horizontal and vertical moving mechanisms 42 and 46 are driven by horizontal/vertical movement drive unit 50, so that substrate 24 is moved toward front barrier 26, i.e., ahead of build-up surface 24a while being moved downward through the monomolecular film developed in developing region 18. In this case, the downward moving speed and horizontal moving speed of substrate 24 are previously determined in accordance with the building-up ratio of the monomolecular film and are input to drive unit 50. In this embodiment, forced control is performed by drive unit 50 so that the downward moving speed of substrate 24 coincides with the horizontal moving speed. Therefore, as is shown in FIG. 3, substrate 24 is moved obliquely downward through developing region 18. As a result, the monomolecular film of a first layer is built up on build-up surface 24a. After substrate 24 is dipped in water 16 by a predetermined depth, the operations of horizontal and vertical moving mechanisms 42 and 46 are temporarily stopped. Subsequently, mechanisms 42 and 46 are driven again by drive unit 50, so that substrate 24 is moved ahead of build-up surface 24a while being moved upward. Therefore, as is shown in FIG. 4, substrate 24 is moved obliquely upward through developing region 18, and thus, a monomolecular film of a second layer is built up on build-up surface 24a. The above mentioned building-up operation is repeated, so that a required number of monomolecular film can be built up on build-up surface 24a.

As described above, since developing region 18 is partitioned by spacers 20 to have substantially the same width as that of substrate 24, the moleculars can be prevented by spacers 20 from flowing behind substrate 24, i.e., flowing into that region through which substrate 24 has already passed. Therefore as is indicated by arrows in FIG. 2, the flow of developed molecules during the building-up operation becomes a parallel flow in a direction perpendicular to build-up surface 24a of substrate 24. As a result, the flow of molecules does not include a sparse or dense region. In this manner, spacers 20 constitute flow-in regulating means 52 for regulating the flow of molecules during the building-up operation. Substrate 24 is moved forward in a direction of compressing the developed monomolecular film during the building-up operation. Therefore, it is possible to compensate a decrease in surface pressure of the monomolecular film near the substrate due to attachment of the monomolecular film to build-up surface 24a of substrate 24, thus the building-up operation can be performed in a state wherein no surface strain occurs in the monomolecular film.

During the building-up operation, if the monomolecular film cannot be attached to build-up surface 24a of substrate 24 for some reasons, the developed monomolecular film is excessively compressed by the horizontal movement of the substrate. As a result, molecules may be destroyed. In order to prevent thus destruction of molecules, it is preferable that the building-up operation is performed while monitoring the surface pressure of the monomolecular film. When the surface pressure of the monomolecular film is abnormally increased, the building-up operation is stopped.

Macromolecular films were actually built up as follows using a hydrophobic Si substrate as a workpiece. First, polypeptide or polyimide molecules were developed in developing region 18 partitioned by spacers 20 and front and rear barriers 26 and 48, and were compressed to a surface pressure of 25 dyn/cm by front barrier 26. Thereafter, horizontal and vertical moving mechanisms 42 and 46 were driven to repeat the above-mentioned building-up operation. Thus, a 20-layered monomolecular film was built up on the build-up surface of the Si substrate. When the obtained built-up film was observed using an optical microscope and scanning electron microscope (SEM), it was confirmed that the obtained film has a uniform structure and was free from defects.

In another practice, the building-up operation was performed by using $5 \times 10^{-6}$ M of $AlCl_3$ solution as an aqueous solution in trough 12 and using a stearic acid as the developed molecular. Also in this case, a desirable built-up film was obtained.

A building-up operation of a monomolecular film was tried by a conventional film manufacturing apparatus such that the upward/downward movement of the substrate was synchronous with the compression operation of the film. No monomolecular film could be built up on the substrate at all.

Figure 5:
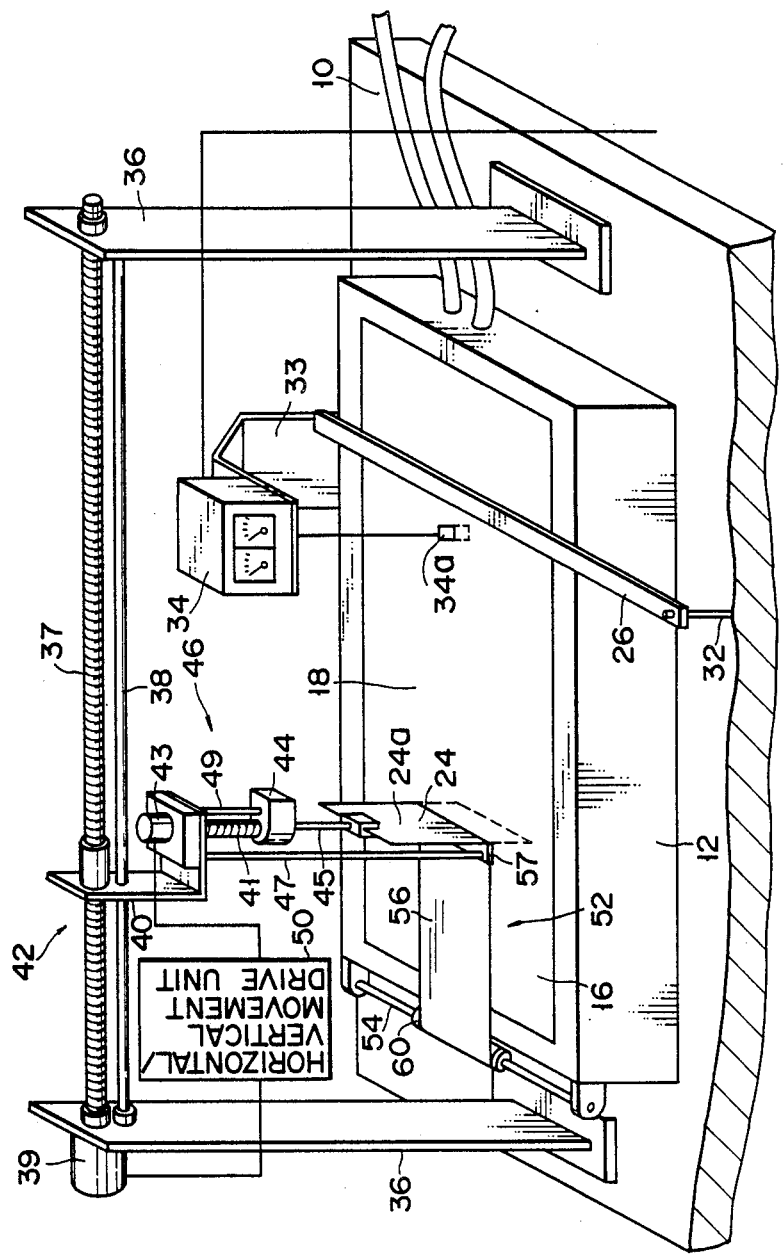
FIG. 5 is a perspective view showing a film manufacturing apparatus according to a second embodiment of the present invention.

In the first embodiment, the pair of spacers 20 are used as flow-in preventing means 52. However, the flow-in preventing means may be arranged as is shown in FIG. 5.

According to this, embodiment, support shaft 54 is attached to that side wall of trough 12 which is located on the rear surface side of substrate 24, and extends along the widthwise direction of the trough. Roller 60, around which Teflon regulating tape 56 constituting flow-in preventing means 52 is wound, is rotatably mounted on support shaft 54. Tape 56 has the same width as that of substrate 24. In place of the rear barrier, support rod 57 having the same length as the width of substrate 24 is arranged to be in contact with the rear surface of the substrate. Support rod 57 is supported by moving table 40 through supporting arm 47. The free end of regulating tape 56 is fixed to support rod 57, and tape 56 is in contact with the liquid surface of constant-temperature water 16. When support rod 57 is moved forward together with substrate 24 upon movement of table 40, regulating tape 56 is fed from roller 60 and follows substrate 24. For this reason, during the building-up operation of the monomolecular film, regulating tape 56 is moved forward while burying that region of developing region 18 through which substrate 24 has passed, thereby preventing flow-in of molecules into this region.

Also in the second embodiment with the above arrangement, the flow of molecules during the building-up operation can become a parallel flow perpendicular to build-up surface 24a of substrate 24. As a result, a desirable built-up film can be formed.

Figure 6:
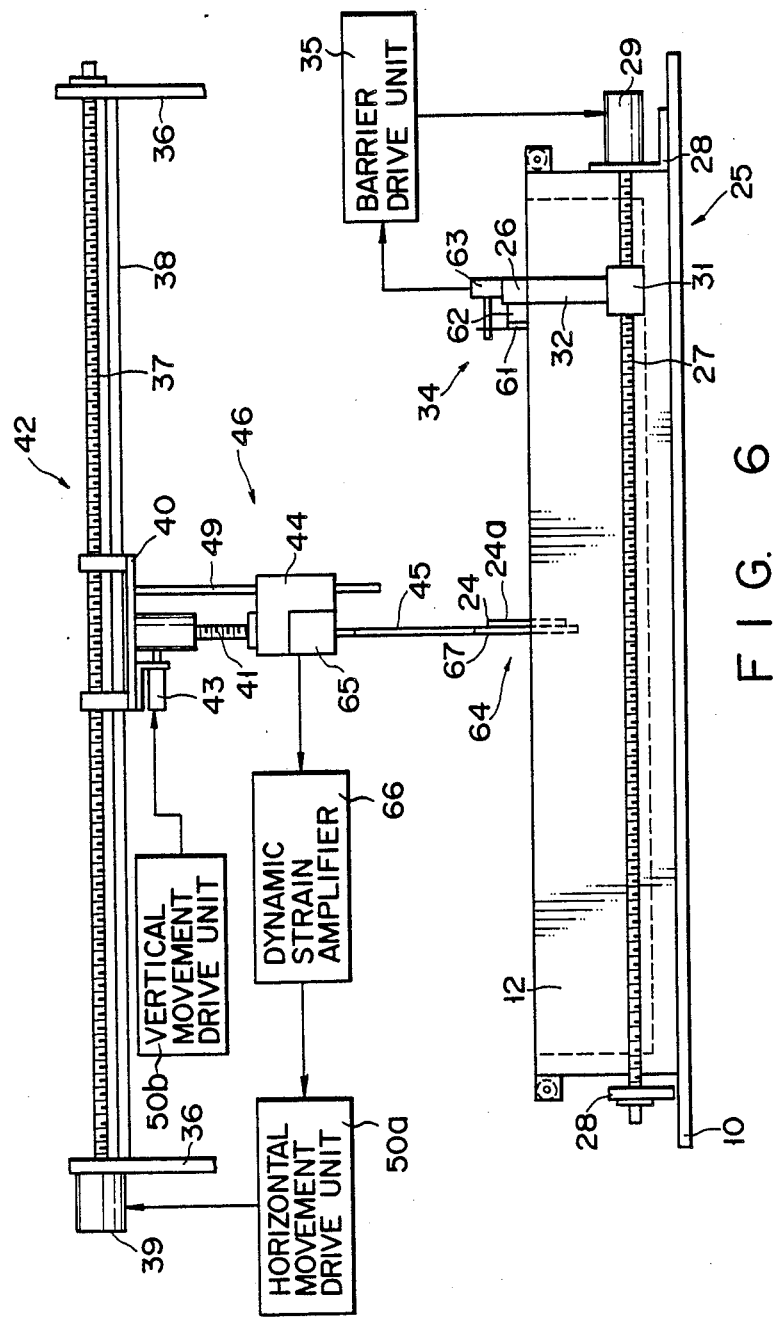
Figure 7:
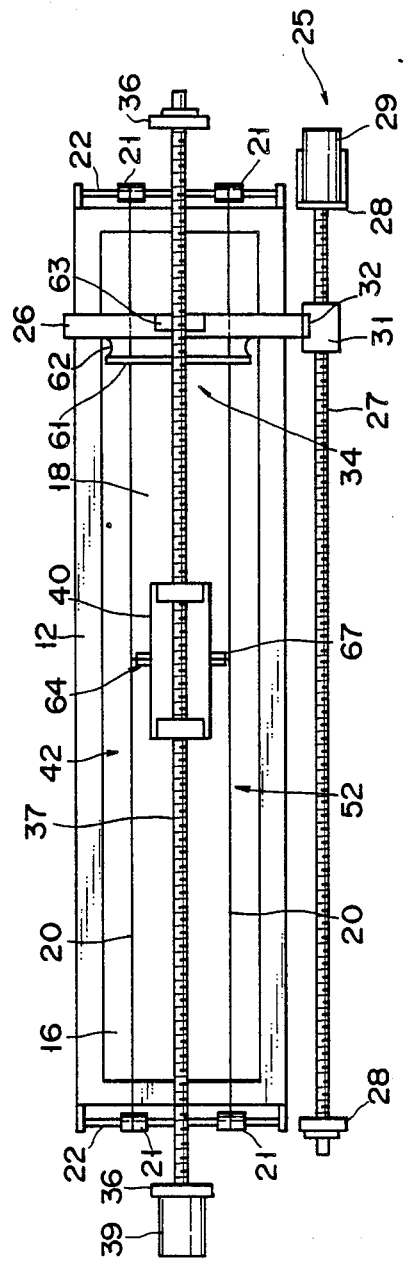
Figure 8:
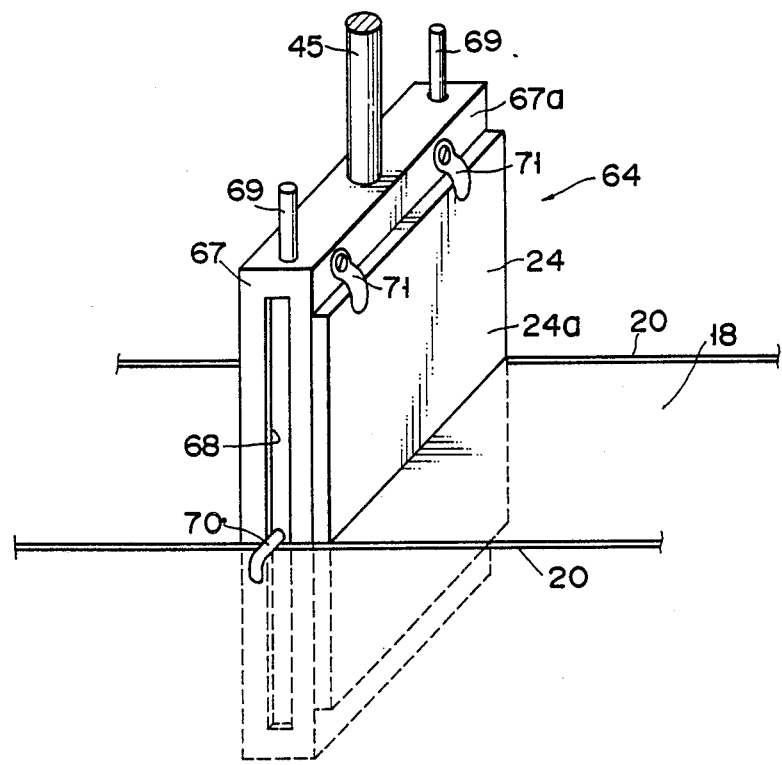

FIGS. 6 to 8 show a film manufacturing apparatus according to a third embodiment of the present invention. In this embodiment, the same reference numerals as in the first embodiment denote the same parts as in the first embodiment, and a detailed description thereof will be omitted.

In the third embodiment, a pair of spacers 20 are formed of Teflon strings in place of Teflon tapes. The rear barrier is omitted, and only front barrier 26 is arranged. Langmuir-type surface pressure balance 34 is attached to front barrier 26. Balance 34 has elongated float 61 floating on the liquid surface of constant-temperature water 16. The float is arranged inside front barrier 26 to be parallel thereto. Two ends of float 61 are coupled to barrier 26 through thin metal foils 62 of Au or Pt, which serve as leaf springs. The float is connected to strain gauge 63 mounted on barrier 26. No monomolecular film is developed on the liquid surface enclosed by front barrier 26, float 61, and metal foils 62. For this reason, float 61 is pressed toward front barrier 26 by surface pressure $\pi$ of the monomolecular film developed on developing region 18 partitioned by spacers 20, work 64 (to be described later), and the float, and is stopped when the surface pressure balances the elastic force of metal foils 62. The position of float 61 is detected by strain gauge 63 and is converted to an electrical signal. Surface pressure $\pi$ of the monomolecular film is measured based on the electrical signal, i.e., the position of float 61. Surface pressure $\pi$ detected by strain gauge 63 is input to barrier drive unit 35, and unit 35 drives pulse motor 29 of barrier moving mechanism 25 in accordance with the detected surface pressure.

Vertical moving mechanism 46 includes strain gauge 65 of a right-angle displacement type. Workpiece 64 is suspended from gauge 65 through supporting arm 45. When a pressure acts on gauge 65 through arm 45, a strain generates in gauge 65 and is converted to an electrical signal by dynamic strain amplifier 66. Pulse motor 39 of horizontal moving mechanism 42 is driven by horizontal movement drive unit 50a based on the electrical signal from amplifier 66. Note that pulse motor 43 of vertical moving mechanism 46 is driven by vertical movement drive mechanism 50b.

As is shown in FIG. 8, in the third embodiment, workpiece 64 is constituted by holder 67 fixed to the lower end of supporting arm 45, and substrate 24 held by the holder. Holder 67 is formed in a thin-walled rectangular prism and is fixed to supporting arm 45 so that its front surface 67a is perpendicular to developing region 18 and is perpendicular to the longitudinal direction of spacers 20. Front surface 67a is subjected to a surface treatment so that a monomolecular film can be attached thereto. Guide grooves 68 extending in the vertical direction are formed in the two vertically extending side surfaces of holder 67, respectively. A pair of wires 69 extending in the vertical direction are inserted through holder 67 to be movable in their axial direction. Teflon-coated hook 70 is fixed to each wire 69 and extends outwardly from holder 67 through corresponding guide groove 68. Therefore, each hook 70 is vertically movable along corresponding guide groove 68. Substrate 24 is held by a pair of holding members 71 while its rear surface is in tight contact with front surface 67a of holder 67.

As is shown in FIG. 8, when workpiece 64 is moved downward by vertical moving mechanism 46 in a state wherein the distance between spacers 20 is adjusted to be substantially equal to the width of holder 67, the pair of hooks 70 are hooked on corresponding spacers 20 from the upper direction. During horizontal movement of workpiece 64, hooks 70 slide on spacers 20 with a little friction. Developing region 18 defined between spacers 20 is partitioned into front and rear regions by workpiece 64. The distance between spacers 20 is adjusted to be slightly larger than the width of holder 67 (by, e.g., about 0.5 mm).

A method of forming an LB film using the film manufacturing apparatus with the above arrangement will be described.

First, the lower end of workpiece 64 is dipped in developing region 18 after the distance between spacers 20 is adjusted to be substantially equal to the width of holder 67, thereby partitioning the developing region into front and rear regions. In this state, organic molecules are developed in the front region, i.e., a region defined by spacers 20, work 64, and float 61 (and front barrier 26). Then, the monomolecular film is compressed to obtain predetermined surface pressure $\pi 1$ by front barrier 26. Note that since the rear region is a pure water surface, its surface pressure is $\pi 2 = 0$. In this case, a strain is generated in strain gauge 50 by pressure difference $\Delta \pi = \pi 1$ acting on workpiece 64, and is converted into an electrical signal by dynamic strain amplifier 66. Then, horizontal movement drive unit 50a drives horizontal moving mechanism 42 so that when the electrical signal is smaller than a predetermined value, workpiece 64 is moved forward; otherwise, moved backward.

When workpiece 64 is moved downward in a small range, the monomolecular film in developing region 18 is built up on build-up surface 24a of substrate 24. In this case, since the molecules ahead of substrate 24 have a large viscosity, a small decrease in surface pressure of the monomolecular film near the substrate is not transmitted to surface pressure balance 34 attached to front barrier 26. However, the decrease in surface pressure is detected by strain gauge 34 since a pressure difference acting on workpiece 64 changes. Therefore, workpiece 64 is moved forward to compress the monomolecular film until pressure difference $\Delta \pi$ corresponds to $\pi 1$. Workpiece 64 is moved vertically (upward or downward) and horizontally by horizontal and vertical moving mechanisms 42 and 46 while the above-mentioned control operation for the pressure difference is continuously performed, thereby building up the monomolecular films on substrate 24. With the above operation, the building-up operation can be performed while keeping a constant surface pressure molecular density without applying a surface strain on the monomolecular film in developing region 18.

In practice, a building-up operation was performed as follows. First, 2.0 mM of a cadmium chloride aqueous solution were stored in trough 12, and pentacosa-9,11-diynoic-1-acid (diacetylene molecules) was developed thereon. Thereafter, the developed molecules were compressed to obtain a surface pressure of 25 dyn/cm by front barrier 26. The diacetylene monomolecular film was irradiated with ultraviolet rays by a mercury lamp to be polymerized. A 20-layered monomolecular film was then built up by the above-mentioned building-up operation. An X-ray diffraction pattern of the obtained monomolecular film exhibited a high-order diffraction peak. According to calculations, it was confirmed that the film obtained was a good Y-type built-up film having an interlayer distance of 34Å.

Similarly, in another case wherein the building-up operation was performed while a stearate was developed on the liquid surface of $5 \times 10^{-6}$ M of AlCl$_3$ solution, the film obtained was a good Y-type built-up film having an interlayer distance of 50 Å.

In contrast to this, a vertical building-up method was practiced at a constant position without horizontally moving a substrate in synchronism with the compression operation by the barrier, using a conventional film manufacturing apparatus. In this case, no polymerized monomolecular film of diacetylene molecules could be built up at all.

In the third embodiment, a rectangular substrate having the same width as that of holder 67 is used as substrate 24. However, a monomolecular film can be built up on a substrate of any shape if the substrate is smaller than front surface 67a of holder 67. For example, if a triangular substrate is used, holder front surface 67a is partially exposed. As described above, since front surface 67a is subjected to a surface treatment to allow attachment of a monomolecular film, a monomolecular film is also built up on the exposed portion of holder front surface 67a as well as build-up surface 24a of substrate 24 during the building-up operation. If a monomolecular film cannot be attached to holder front surface 67a, the monomolecular film developed on the liquid surface is excessively compressed by the exposed portion of front surface 67a, and thus, molecules may be destroyed. According to this embodiment, however, a monomolecular film can be built up on substrates having various shapes without destroying molecules.

Figure 9:
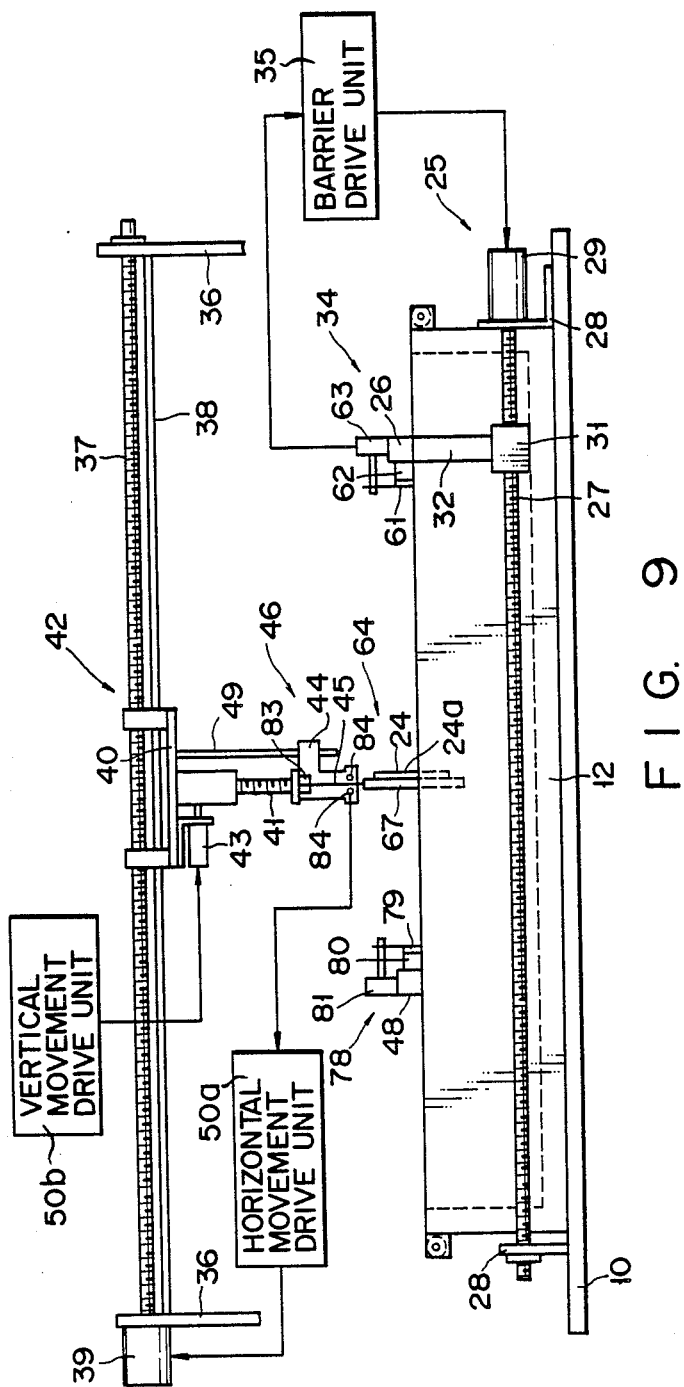
Figure 10:
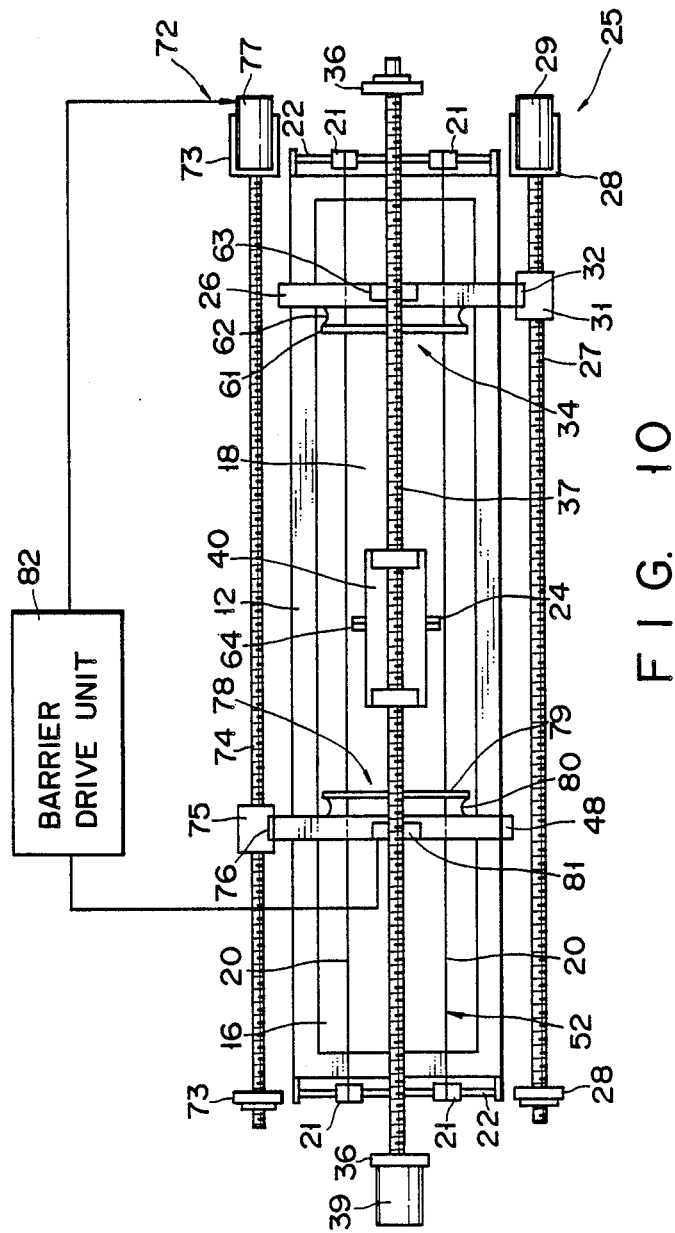

FIGS. 9 and 10 show a film manufacturing apparatus to a fourth embodiment of the present invention. The same reference numerals in this embodiment denote the same parts as in the third embodiment described above, and a detailed description thereof will be omitted. That is, portions different from the third embodiment will be explained below.

According to the fourth embodiment, rear barrier 48 is arranged on through 12 at the side opposite to front barrier 26 with interposing workpiece 64 between barriers 26 and 28. Barrier moving mechanism 72 for moving rear barrier 48 in the longitudinal direction of spacers 20 comprises a pair of support plates 73, lead screw 74, moving table 75, arm 76, and pulse motor 77, as in barrier moving mechanism 25.

Langmuir-type surface pressure balance 78 is attached to rear barrier 48. Balance 78 has the same structure as that of balance 34 on the side of front barrier 26, and includes float 79, metal foils 80, and strain gauge 81 as components. Pulse motor 77 of barrier moving mechanism 72 is driven by barrier driving unit 82 based on the surface pressure of a monomolecular film measured by surface pressure balance 78.

Workpiece 64 is supported by moving table 44 of vertical moving mechanism 46 through supporting arm 45. The upper end of arm 45 is attached to table 44 to be pivotal along the longitudinal direction of spacers 20, and is engaged with electromagnetic clamp 83 mounted on table 44. When clamp 83 is deenergized, supporting arm 45 can be freely pivoted without friction. When the clamp is energized, arm 45 is fixed to be perpendicular to developing region 18. Workpiece 64 is constituted by holder 67 fixed to the lower end of arm 45 and substrate 24 held by the holder. When clamp 83 is energized, build-up surface 24a of the substrate becomes perpendicular to developing region 18. A pair of optical sensors 84 are provided at moving table 44, and arm 45 extends between these sensors. When arm 45 is pivoted and is displaced from its vertical position, this displacement is detected by optical sensors 84. Horizontal movement drive unit 50a drives horizontal moving mechanism 42 based on the detection signal from sensors 84 so that arm 45 is returned to its vertical position.

An LB film is formed as follows using the film manufacturing apparatus with the above arrangement.

First, the lower end of workpiece 64 is dipped in the liquid surface while the distance between spacers 20 is adjusted to be substantially equal to the width of workpiece 64, thereby partitioning developing region 18 into front and rear regions with respect to the workpiece. Subsequently, organic molecules to be built up are developed in the front region, i.e., a region defined by spacers 20, substrate 24, and float 61, (and front barrier 26). Molecules with a small viscosity, e.g., stearyl alcohol molecules are developed in the rear region, i.e., a region defined by spacers 20, holder 67, and float 79 (and rear barrier 48). Electromagnetic clamp 83 is then energized to fix supporting arm 45 in the vertical position. In this state, the monomolecular films developed in the front and rear regions are compressed by front and rear barriers 26 and 48 so that their surface pressures are equal to a predetermined surface pressure ($\pi 1 = \pi 2$). When clamp 83 is deenergized in this condition, since the surface pressures ahead of and behind workpiece 64 are equal to each other, workpiece 64 is stopped in position.

When workpiece 64 is moved downward in a small range, the monomolecular film in the front region is built up on build-up surface 24a of substrate 24. At this time, since the molecules in the front region have a large viscosity, a small decrease in surface pressure near substrate 24 is not immediately transmitted to surface pressure balance 34 attached to front barrier 26. In contrast to this, for the stearyl alcohol monomolecular film in the rear region, a decrease in surface pressure near holder 67 is instantaneously transmitted to surface pressure balance 78. Thus, rear barrier 48 performs the compression operation, and the surface pressure of the monomolecular film developed in the rear region can be maintained to be a predetermined value. As a result, the surface pressure ahead of workpiece 64 becomes lower than the rear surface pressure, and the workpiece is slightly pushed forward and is stopped when the front and rear surface pressures of workpiece 4 are balanced. In this state, supporting arm 45 is inclined forward together with workpiece 64, and its inclination is detected by optical sensors 84. Thus, horizontal movement driving unit 50a drives pulse motor 39 of horizontal moving mechanism 42 based on the signals from optical sensors 84, so as to move moving table 40 until the inclination of supporting arm 45 becomes zero. Vertical moving mechanism 46 is driven by vertical movement drive unit 50b while continuously performing the above-mentioned control operation. Thus, workpiece 64 is moved vertically (upward or downward) and horizontally, thereby building up monomolecular films. With the above operation, monomolecular films can be built up on build-up surface 24a of substrate 24 while maintaining a predetermined surface pressure molecular density without causing a surface strain in the monomolecular film developed in developing region 18.

In this embodiment, an organic thin film having a uniform structure and free from defects can be formed.

After the above-mentioned operation, a stearyl alcohol monomolecular film is built up also on the rear surface of holder 67. The monomolecular film of the first layer built up on the rear surface of holder 67 by the upward or downward operation of workpiece 64 is reversibly peeled onto the liquid surface by the next downward or upward operation. During this interval, the surface pressure of the stearyl alcohol monomolecular film is maintained to be a predetermined value by rear barrier 48. Therefore, the stearyl alcohol monomolecular film in the rear region is not decreased regardless of the number of monomolecular films built up on the build-up surface 24a of substrate 24. As a result, molecules need not be replenished in the rear region.

In practice, a 20-layered diacetylene monomolecular film was built up on a substrate following the same procedures as in the fourth embodiment. The X-ray diffraction pattern of the obtained built-up film exhibited a high-order diffraction peak, and according to calculations, it was confirmed that the obtained film was a good Y-type built-up film having an interlayer distance of 34 Å.

Also in the case wherein an aluminum stearate was used as the developed molecules, a good built-up film was obtained.

A method of shortening a film formation time using the apparatus of the fourth embodiment will be described below. In this case, a description is made using the film formation apparatus of the fourth embodiment. However, as will be described later, in this method, since no compression operation by using the front barrier is performed, the front barrier and the Langmuir-type surface pressure balance attached thereto need not always be arranged.

Figure 11:
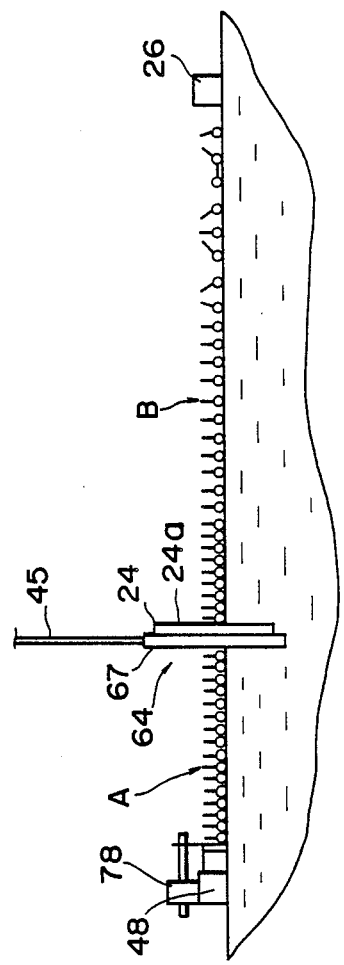
Figure 12:
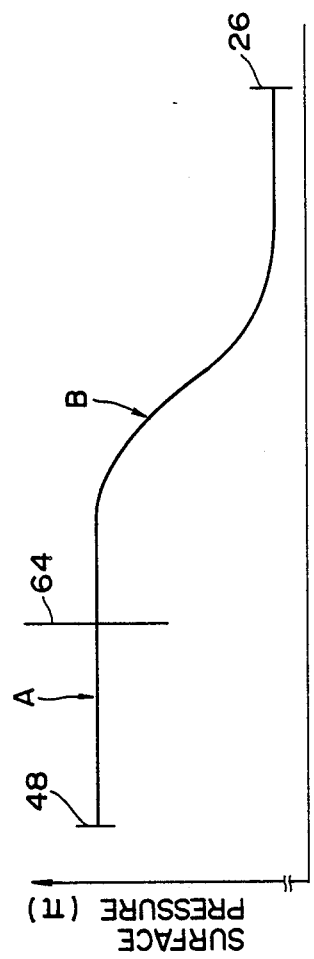

In the same manner as in the above embodiment, first, organic molecules to be built up are developed in the front region for workpiece 64, and molecules having a small viscosity, e.g., stearyl alcohol molecules are developed in the rear region for the workpiece. Then, electromagnetic clamp 83 is deenergized to cause supporting arm 45 to be movable. In this state, the stearyl alcohol monomolecular film in the rear region is compressed to predetermined surface pressure $\pi 2$ by rear barrier 48. Meanwhile, front barrier 46 is fixed in position, and the monomolecular film in the front region is not compressed. As a result, the surface pressure behind workpiece 64 is gradually increased. Since the surface pressure ahead of workpiece 64 is almost 0, workpiece 64 is pushed forward, thus compressing the molecules with a large viscosity. More specifically, as is shown in FIG. 11, when rear barrier 48 compresses stearyl alcohol monomolecular film A, monomolecular film A pushes work 64, and workpiece 64 compresses front monomolecular film B having a large viscosity. FIG. 12 illustrates a surface pressure distribution of monomolecular films A and B in this case. As can be seen from FIG. 12, in the front region for workpiece 64, only the surface pressure of monomolecular film B near substrate 24 is increased and balances the surface pressure of stearyl alcohol monomolecular film A. However, the surface pressure of monomolecular film B in a region far from the substrate is not yet increased. In this manner, in the region near substrate 24, since the surface pressure of the monomolecular film has reached a predetermined value, the building-up operation can be performed in the same manner as in the fourth embodiment. During performance of the building-up operation pressure is gradually transmitted to the monomolecular film developed in a region far from substrate 24, and the surface pressure has reached a predetermined value. Therefore, the building-up operation can be continuously performed.

In practice, poly($\gamma$-benzyl-L-glutamate) (molecular weight = 100,000) was used as molecules with a large viscosity, and 20-layered monomolecular films were built up on a substrate by using the method shown in the fourth embodiment and the above-mentioned method of shortening the film formation time, respectively. Then, the time periods required for the building-up operations were compared.

In the former method, a compression rate of the monomolecular film by front barrier 26 must be reduced to 0.1 cm/min (1/100 as compared to stearyl alcohol having a small viscosity). For this reason, in order to form a monomolecular film having a length of 50 cm and a surface pressure of 25 dyn/cm on a trough having a width of 2.5 cm, molecules were developed in a developing region having an area twice that of the desired monomolecular film and were compressed, it took 21 hours. Then, when 20 monomolecular film layers were built up on the build-up surface of a substrate having a length of 2.5 cm with the vertical moving speed of the workpiece being 2 mm/min, it took about 5 hours. Therefore, the total time was about 26 hours.

In contrast to this, when the building-up operation was conducted while the workpiece itself compressed the monomolecular film according to the latter method, the time required for building up 20 monomolecular film layers was 7 hours, and the operation could be completed within one-fourth the time required for the former method.

A fifth embodiment of the present invention will be described below.

This embodiment is substantially the same as the above embodiments, except that an operation of inclining a work through a predetermined angle with respect to a developed monomolecular film is performed in addition to the vertical and horizontal movements of the workpiece.

Figure 13:
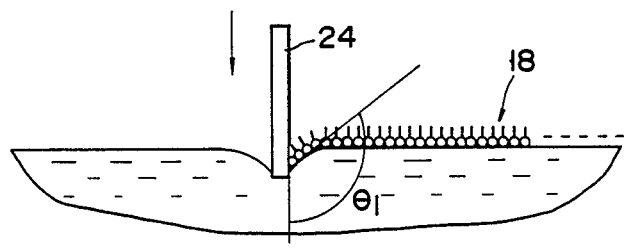
Figure 14:
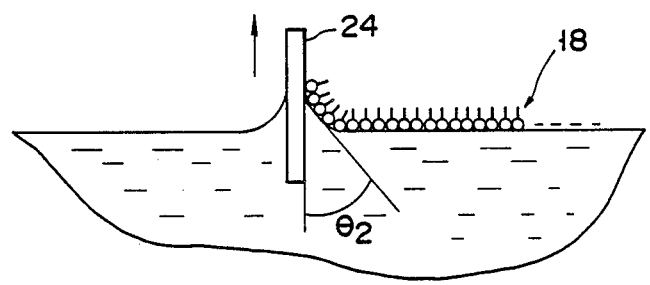

As shown in FIG. 13, when substrate 24 is moved downward through the developed monomolecular film, a meniscus is formed at the boundary region between the substrate surface and the liquid surface, and the liquid surface is curved downward. Similarly, when substrate 24 is moved upward through the monomolecular film, the liquid surface is curved upward, as is shown in FIG. 14, at the boundary region between the substrate surface and the liquid surface. Such a curve may cause a surface strain in the monomolecular film developed on the liquid surface. The angle $\theta$ defined by the surface of substrate 24 and the liquid surface is called a contact angle. As can be seen from FIGS. 13 and 14, the contact angles ($\theta 1$, $\theta 2$) differ when the substrate is moved downward and upward. For this reason, when the movement of the substrate is switched from downward to upward and vice-versa, only the meniscal wave is changed, and a monomolecular film cannot be attached to the substrate for a given period of time. During this period, when the substrate vertically held with respect to the monomolecular film is horizontally moved, the monomolecular film may be excessively compressed.

Figure 15A:
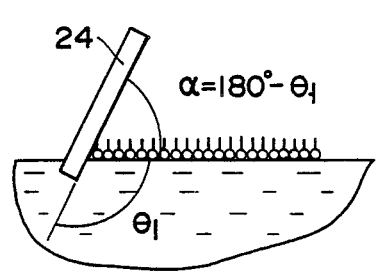
FIGS. 15A and 15B are side views schematically showing building-up processes during downward movement of the substrate, respectively.
Figure 16A:
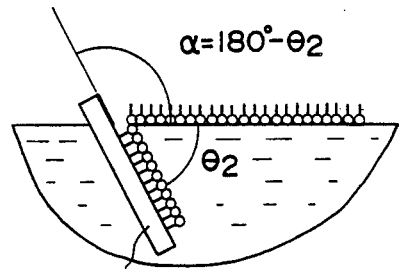
FIGS. 16A and 16B are side views schematically showing building-up processes during upward movement of the substrate, respectively.
Figure 15B:
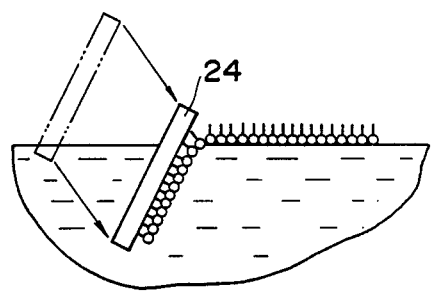
Figure 16B:
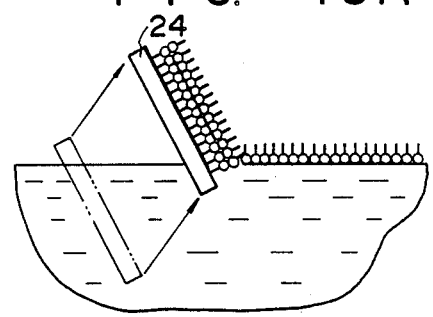

This embodiment utilizes a nature that even if angle $\alpha$ of the substrate with respect to the liquid surface is changed, the contact angle has a constant value. In this embodiment, the building-up operation is performed in a state wherein the substrate is inclined at angle $\alpha = 180° - \theta$ with respect to the liquid surface. More specifically, as is shown in FIGS. 15A and 15B, the building-up operation of the monomolecular film is performed by moving the substrate downward and forward while substrate 24 is inclined at angle $\alpha = 180° - \theta 1$ with respect to the liquid surface so that the curve of the liquid surface near the substrate is eliminated, thereby keeping the liquid surface flat. Further, as is shown in FIGS. 16A and 16B, substrate 24 is inclined at angle $\alpha = 180° - \theta 2$ with respect to the liquid surface, and the substrate is moved upward and forward in this state, thereby building up the monomolecular film. Since contact angles during the upward and downward movement of the substrate are different from each other, these contact angles were measured by testing, and inclination angle $\alpha$ of the substrate with respect to the liquid surface is determined in accordance with the test values.

Figure 17:
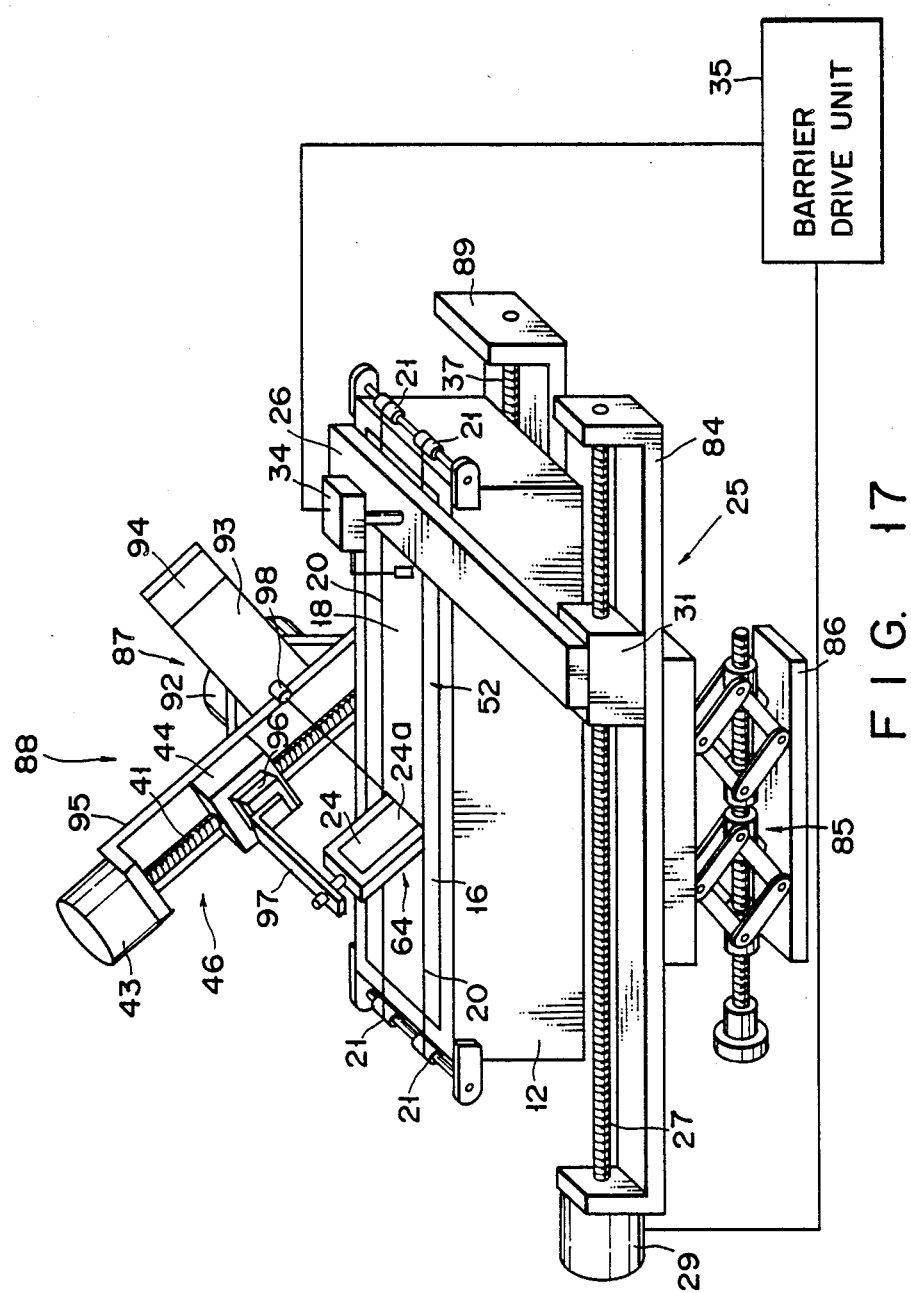
Figure 18:
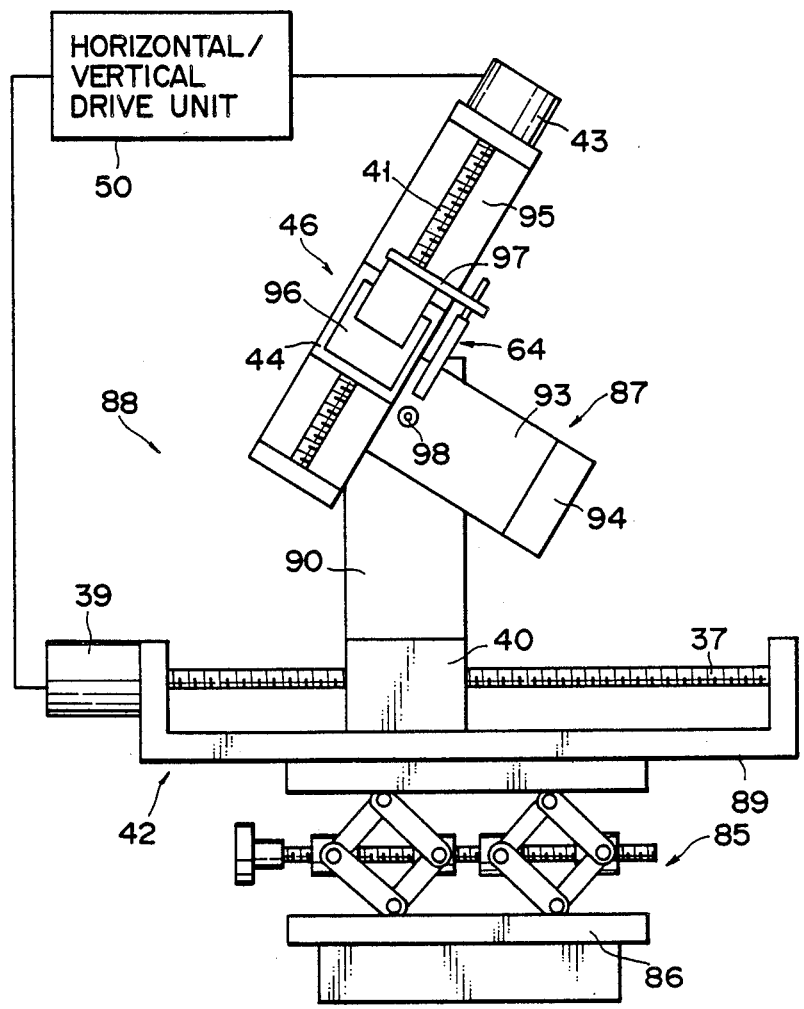
Figure 19:
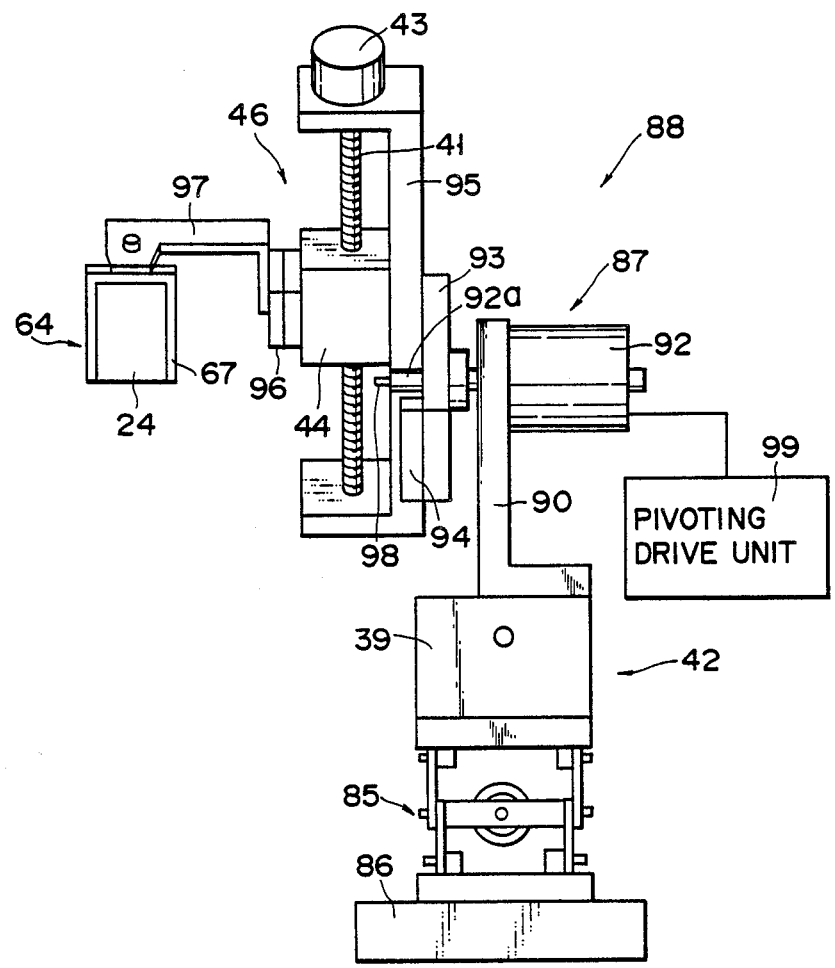

According to this embodiment, the film manufacturing apparatus comprises a rotating mechanism for inclining the substrate with respect to the liquid surface in addition to the vertical and horizontal moving mechanisms. The film formation apparatus according to the fifth embodiment will be described hereinafter with reference to FIGS. 17 to 19. The same reference numerals in this embodiment denote the same parts as in the above embodiments, and a detailed description thereof will be omitted.

Front barrier 26 is arranged on the right end portion of trough 12, and barrier moving mechanism 25 for moving the front barrier is arranged aside the trough. Barrier moving mechanism 25 has elongated guide plate 84 extending in the longitudinal direction of trough 12, and the two end portions of guide plate 84 are bent at a right angle. Lead screw 27 extends between the two end portions of guide plate 84, and pulse motor 29 for rotating the lead screw is mounted on one end portion of the guide plate. Moving table 31 is engaged with lead screw 31, and one end of front barrier 26 is fixed to the moving table. Therefore, when pulse motor 29 is driven to move moving table 31, the compression operation by front barrier 26 can be performed. Wilhelmy-type surface pressure balance 34 for measuring a surface pressure of a monomolecular film on developing region 18 partitioned by spacers 20 is provided on front barrier 26. Pulse motor 29 of barrier moving mechanism 25 is driven by barrier drive unit 25 in accordance with the surface pressure measured by balance 34. Barrier moving mechanism 25 with the above arrangement is mounted on a platen with an anti-vibration mechanism (not shown) through high-precision jack 85 for adjusting the height of the barrier moving mechanism and magnet base 86.

On the opposite side of through 12 is arranged building-up mechanism 88 consisting of horizontal moving mechanism 42, vertical moving mechanism 46, and rotating mechanism 87.

Horizontal moving mechanism 42 has elongated guide plate 89 extending in the longitudinal direction of trough 12, and two end portions of the guide plate are bent at a right angle. Lead screw 37 extends between the two end portions of guide plate 89, and pulse motor 39 for rotating the lead screw is mounted on one end portion of the guide plate. Moving table 40 is engaged with lead screw 37. When pulse motor 39 is driven, moving table 40 is moved along the axial direction of the lead screw. Mechanism 42 is mounted on the platen with the anti-vibration mechanism through high-precision jack 85 and magnet base 86.

Rotating mechanism 87 comprises supporting column 90 erected on moving table 40, and pulse motor 92 fixed to the column. Motor 92 is arranged so that its rotating shaft 92a is perpendicular to the longitudinal direction of trough 12 and located within a plane parallel to the liquid surface of the trough. Rotating shaft 92a projects from column 90 toward trough 12 and is fixed to the intermediate portion of elongated rotary plate 93. Therefore, when pulse motor 92 is driven, rotary plate 93 is rotated within a plane perpendicular to the liquid surface of trough 12. Vertical moving mechanism 46 is mounted on one end portion of rotary plate 93, and weight 94 for balancing a weight with mechanism 46 is mounted on the other end portion of plate 93.

Vertical moving mechanism 46 has elongated guide plate 95 fixed to rotary plate 93. The guide plate extends in a direction perpendicular to rotary plate 93 and is located within a plane perpendicular to the liquid surface of trough 12. Two end portions of guide plate 95 are bent at a right angle, and lead screw 41 extends between the two end portions. Pulse motor 43 for rotating the lead screw is mounted on one end portion of guide plate 95. Moving table 44 is engaged with lead screw 41. When pulse motor 43 is driven, moving table 44 is moved along lead screw 41. Thus, vertical moving mechanism 46 can be rotated by mechanism 87 within a plane perpendicular to the liquid surface of trough 12.

Compact X-stage 96 and supporting arm 97 are sequentially fixed on moving table 44 of vertical moving mechanism 46, and workpiece 64 is supported by supporting arm 97. Workpiece 64 is constituted by substantially U-shaped holder 67 fixed to supporting arm 97 and is formed of stainless steel, and substrate 24 held by the holder. Workpiece 64 is supported so that build-up surface 24a of substrate 24 is located within a plane parallel to the moving direction of moving table 44 and rotating shaft 92a of pulse motor 92 of rotating mechanism 87. Red semiconductor laser oscillator 98 is attached to the free end of rotating shaft 92a of pulse motor 92. The laser oscillator emits a laser beam coinciding with the central axis of rotating shaft 92a.

By building-up mechanism 88 with the above arrangement, work 64 can be moved horizontally and vertically with respect to the liquid surface of trough 12, i.e., developing region 18, and the inclination angle of the work with respect to the developing region can be adjusted. The horizontal and vertical moving speeds of work 64 are controlled by horizontal/vertical movement drive unit 50 connected to pulse motors 39 and 43 of mechanisms 42 and 46, and the inclination angle of the work is controlled by rotation drive unit 99 connected to pulse motor 92 of mechanism 87. The position of work 64 is adjusted by compact X-stage 96 so that build-up surface 24a of substrate 24 is located on the center of rotation of rotating mechanism 87. This adjustment is performed on the basis of a laser beam emitted from laser oscillator 98. Upon this adjustment, even when workpiece 64 is moved by horizontal and vertical moving mechanisms 42 and 46, the substrate can always be rotated about the boundary between build-up surface 24a of substrate 24 and developing region 18.

Note that trough 12 is mounted on the platen with the anti-vibration mechanism through a high-precision jack and a magnet base, as barrier moving mechanism 25 and building-up mechanism 88.

A typical building-up method using the film manufacturing apparatus with the above arrangement will be described below.

The height of trough 12, barrier moving mechanism 25, and building-up mechanism 88 are adjusted by high-precision jacks 85 so that developing region 18 of trough 12 coincides with the rotational central axis of rotating mechanism 87. The position of workpiece 64 is adjusted by compact X-stage 96 so that build-up surface 24a of substrate 24 is located on the rotational central axis of mechanism 87.

Developing region 18 having the same width as that of workpiece 64 is defined by a pair of spacers 20. Workpiece 64 is then rotated by mechanism 87 so that build-up surface 24a of substrate 24 is perpendicular to developing region 18. Thereafter, workpiece 64 is moved downward until the lower end of the work is brought into contact with developing region 18, thereby partitioning developing region 18 into front and rear regions with respect to the work. Subsequently, a monomolecular film is developed in the front region and is compressed by front barrier 26 until a predetermined surface pressure is obtained. When substrate 24 is a hydrophobic substrate, for example, inclination angle $\alpha$ of the substrate is adjusted to be $\alpha = 180° - \theta 1$ (see FIG. 15A) with respect to contact angle $\theta 1$ for downward movement of the substrate. Assume that the upward and forward speed of work 64 are $+V$. In this case, moving speed $V_H$ of horizontal moving mechanism 42 corresponds to moving speed $V_W$ of the boundary between build-up surface 24a and the monomolecular film with respect to the monomolecular film, and moving speed $V_I$ of vertical moving mechanism 46 corresponds to moving speed $V_S$ of the boundary with respect to build-up surface 24a. For this reason, in any inclination angle $\alpha$ of substrate 24, if the moving speeds of horizontal and vertical moving mechanisms 42 and 46 are set to be equal to each other ($VH = |V_I|$), it is possible to realize an operation mode ($V_W = |V_S|$) wherein the monomolecular film in developing region 18 is built up on build-up surface 24a of the substrate in one-to-one correspondence. Therefore, workpiece 64 is moved downward and forward at the same speed through the monomolecular film so that, a monomolecular film of a first layer is built up on build-up surface 24a of substrate 24.

Subsequently, inclination angle o of substrate 24 is adjusted to be $\alpha = 180° - \theta 2$ (see FIG. 16) in accordance with inclination angle $\theta 2$ during the upward movement of the substrate. Then, work 64 is moved upward and forward at the same speed through the monomolecular film, so that a monomolecular film of a second layer is built up on build-up surface 24a of substrate 24.

According to the above-mentioned film manufacturing apparatus and the building-up method, the building-up operation can be performed while maintaining a constant surface molecular density without causing a surface strain in the monomolecular film developed in the developing region.

In practice, pentacosa-9,11-diynoic-1-acid (diacetylene molecules) and 2.0 mM of a cadmium chloride aqueous solution were used, and a developed monomolecular film was compressed to 25 dyn/cm. Thereafter, the diacetylene monomolecular film was irradiated with ultraviolet rays by a mercury lamp to be polymerized. In this state, the above-mentioned building-up operation was conducted. An X-ray pattern of the obtained built-up film exhibited a high-order diffraction peak, and according to calculations, it was confirmed that the obtained film was a good Y-type built-up film having an interlayer distance of 34 Å.

In another practice wherein a stearic acid, and $5 \times 10^{-6}$ M AlCl$_3$ aqueous solution were used, a good built-up was also obtained.

In a vertical building-up method using a conventional film formation apparatus, no polymerized film of diacetylene molecules could be built up on the substrate at all. Further, even in the case wherein an aluminum stearate was used, no monomolecular film could be formed on the substrate at all.

Figure 20:
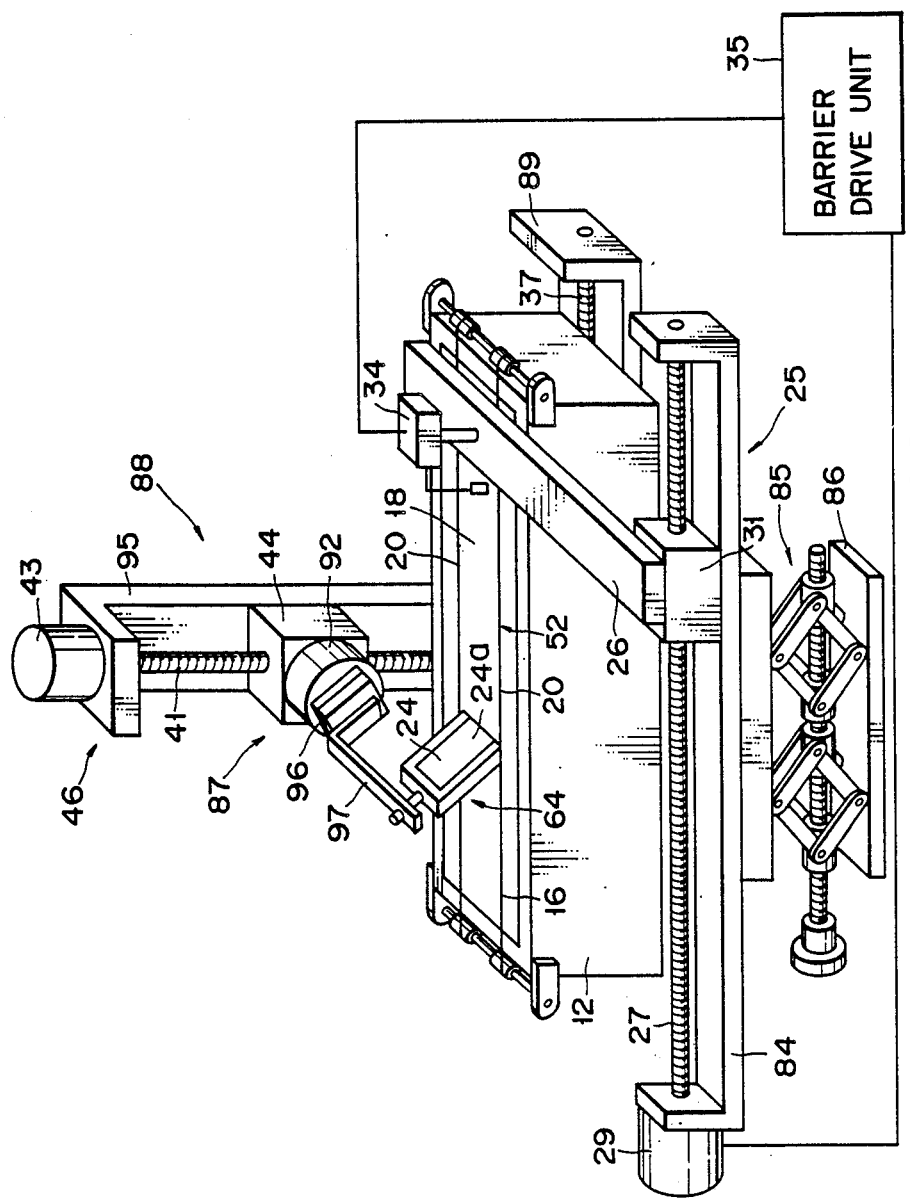
Figure 21:
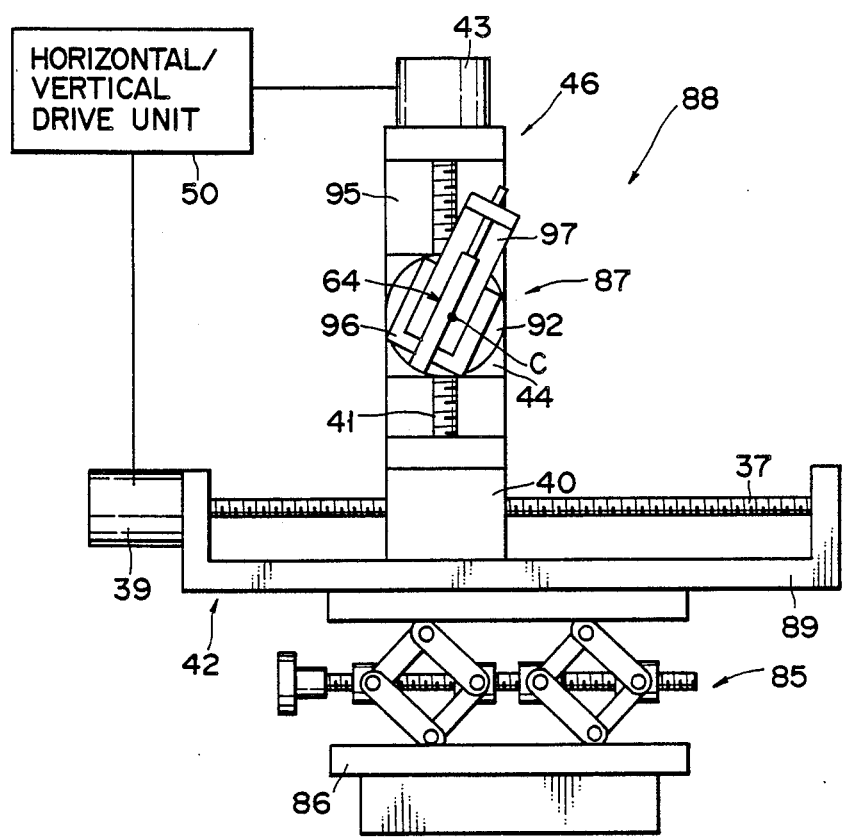
Figure 22:
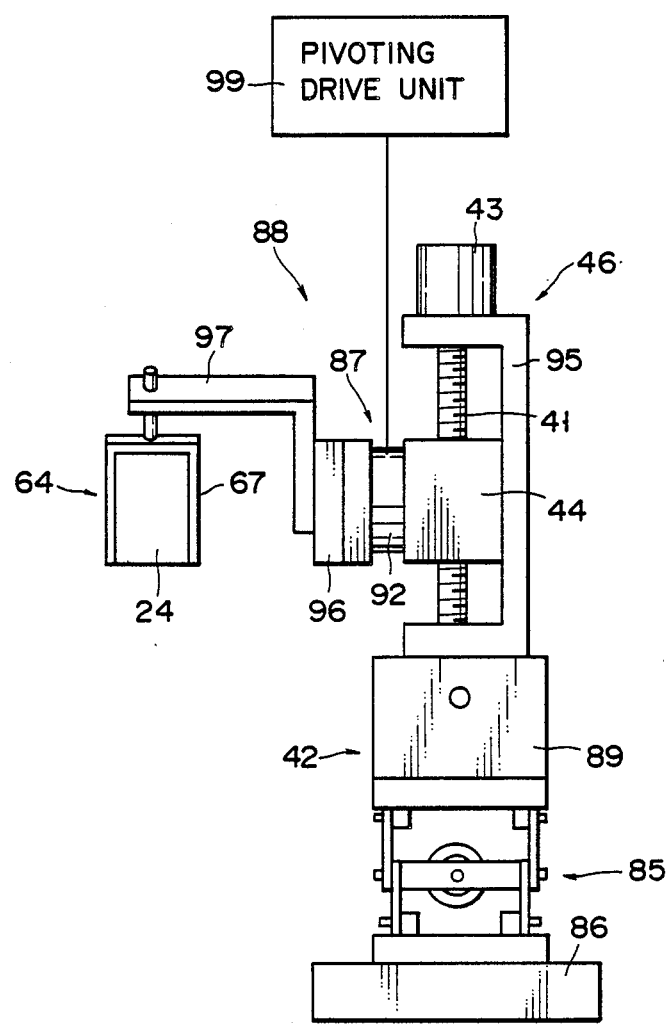

FIGS. 20 to 22 show a film manufacturing apparatus according to still another embodiment comprising a rotating mechanism. In this embodiment, the same reference numerals denote the same parts as in the fifth embodiment, and a detailed description thereof will be omitted.

According to this embodiment, guide plate 95 of vertical moving mechanism 46 is fixed to moving table 40 of horizontal moving mechanism 42 and extends vertically upward from moving table 40. Thin-type pulse motor 92 of rotating mechanism 87 is fixed to moving table 44 of vertical moving mechanism 46. Motor 92 is arranged so that its rotating shaft (not shown) extends parallel to the liquid surface of trough 12 and in a direction perpendicular to the longitudinal direction of the trough. Compact X-stage 96, supporting arm 97, and workpiece 64 are sequentially attached to the rotating shaft of pulse motor 92. As can be seen from FIG. 21, the position of workpiece 64 is adjusted by compact X-stage 96 so that build-up surface 24a of substrate 24 is located on rotational central axis C of pulse motor 92.

A typical building-up method using the film formation apparatus with the above arrangement will be described below.

First, region 18 having the same width as that of workpiece 64 is defined by a pair of spacers 20. Workpiece 64 is rotated by rotating mechanism 87 so that build-up surface 24a is perpendicular to developing region 18. Thereafter, the work is moved downward until the lower end of the work is brought into contact with developing region 18, thereby partitioning developing region 18 into front and rear regions with respect to the workpiece.

Then, workpiece 64 is moved forward while being moved downward at speeds $V_H$ and $V_V$ for the downward movement of the substrate, so that a monomolecular film of a first layer is built up on build-up surface 24a of substrate 24.

Subsequently, inclination angle $\alpha$ of substrate 24 is adjusted to be $\alpha = 180° - \theta_2$ (see FIG. 16A) in accordance with contact angle $\theta_2$ during upward movement of the substrate. Workpiece 64 is then moved upward and forward at speeds $V_H$ and $V_V$ for upward movement of the substrate through the monomolecular film, thereby building up a monomolecular film of a second layer on build-up surface 24a of substrate 24.

According to this embodiment with the above arrangement, the building-up operation can be performed while keeping a constant surface molecular density without causing a surface strain in a developed monomolecular film as in the fifth embodiment.

In the fifth and sixth embodiments, when the inclination angle of substrate 24 is adjusted to be $\alpha = 180° - \theta$ in order to eliminate a curve of the liquid surface caused by the meniscus, contact angle $\theta$ during the building-up operation must be measured in advance. However, the contact angle of some molecules is largely changed even when a liquid property of a liquid surface, a temperature, the type of substrate, hydrophilic/hydrophobic properties, or the like are slightly Subsequently, a monomolecular film is developed in the front region and is compressed by front barrier 26 until a predetermined surface pressure is obtained. When substrate 24 is a hydrophobic substrate, for example, inclination angle $\alpha$ of the substrate is adjusted to be $\alpha = 180° - \theta_1$ (see FIG. 15A) in accordance with contact angle $\theta_1$ during downward movement of the substrate. If the horizontal moving speed of workpiece 64 is given as $V_H$, the vertical moving speed of the work as $V_V$, and inclination angle of substrate 24 as $\alpha$, moving speed $V_W$ of the boundary between build-up surface 24a and the monomolecular film with respect to the monomolecular film and moving speed $V_S$ of the boundary with respect to build-up surface 24a have the following relations:

$$V_W = V_H - V_V \cdot \cot\alpha, \quad V_S = -V_V/\sin\alpha$$

When inclination angle $\alpha$ is determined, $V_H$ and $V_V$ are calculated so that speeds $V_W$ and $V_S$ become predetermined values. In order to realize an operation mode that the monomolecular film on developing region 18 is built up on build-up surface 24a of the substrate in one-to-one correspondence, the relation $V_W = |V_S|$ must be established. Speeds $V_H$ and $V_V$ are expressed by the following relations:

During Downward Movement of Substrate:

$$V_H = (\cot\alpha - 1/\sin\alpha) \cdot V_V$$

During Upward Movement of Substrate:

$$V_H = (\cot\alpha + 1/\sin\alpha) \cdot V_V$$

changed. When such molecules are used, it is difficult to maintain an ideal building-up condition.

Figure 23:
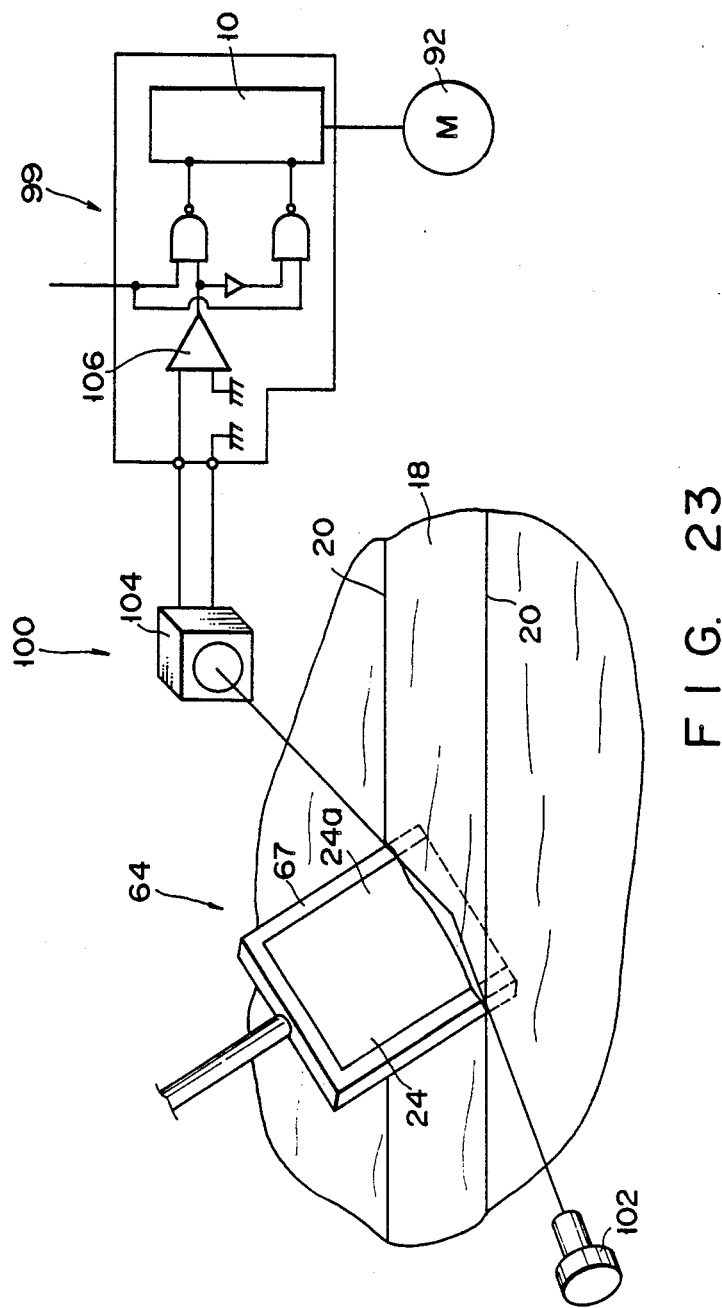
FIG. 23 is a view schematically showing a modification of a position detecting mechanism and a rotary driving mechanism.

To solve the above problem, as in still another embodiment shown in FIG. 23, in place of the method of measuring contact angle in advance, a curvature of the liquid surface near substrate 24 may be detected by liquid surface detector 100 while workpiece 64 is dipped in developing region 18. Then, inclination angle $\alpha$ of substrate 24 can be adjusted by rotating mechanism 87 based on the detection signal from detector 100 so that the curve of the liquid surface is eliminated.

Liquid surface detector 100 comprises laser oscillator 102 and position detecting photodiode 104. The photodiode is connected to pulse motor 92 of rotating mechanism 87 through rotating drive unit 99. Laser oscillator 102 and photodiode 104 are arranged such that a laser beam is emitted from the laser oscillator on the liquid surface portion near the boundary between build-up surface 24a of substrate 24 and developing region 18, and the beam reflected by the liquid surface becomes incident on the photodiode. Photodiode 104 is adjusted so as to output "zero" when it receives a reflection beam from a liquid surface kept flat without being curved. Therefore, when the liquid surface near substrate 24 is curved upward (when contact angle $\theta$ is decreased), the output from photodiode 104 becomes a positive potential. In contrast to this, when the liquid surface is curved downward (when contact angle $\theta$ is increased), the output from the photodiode becomes a positive potential. When the output from photodiode 104 is zero, rotation drive unit 99 does not drive pulse motor 92 of rotating mechanism 87. When the output from the photodiode is positive, unit 99 drives pulse motor 92 so as to increase the inclination angle of substrate 24. When the output is negative, unit 99 drives pulse motor 92 so as to decrease the inclination angle of the substrate. Under this control, building-up operation can be performed while keeping the liquid surface near the substrate flat.

In FIG. 23, reference numerals 106 and 108 denote a zero-cross detector and a motor driver, respectively.

Obviously, numerous modifications and variations of the present invention are possible in light of the above teachings. It is therefore to be understood that within the scope of the appended claims, the invention may be practiced otherwise than as specifically described herein.

What is claimed is:

1. A method of manufacturing a multi-layered organic thin film comprising the steps of:
    preparing a liquid surface for forming a developing region in which a monomolecular film of organic molecules can be developed;
    developing a monomolecular film of organic molecules in the developing region;
    compressing the developed monomolecular film to a predetermined surface pressure;
    supporting a workpiece so that a build-up surface of the workpiece is located perpendicular to the developed monomolecular film; and
    moving the workpiece through the developed monomolecular film in a direction inclined to the developed monomolecular film that includes a directional component which is perpendicular to the build-up surface and directed ahead thereof, to thereby build up the monomolecular film on the build-up surface.

2. A method according to claim 1, wherein said moving direction of the workpiece includes a horizontal component and a vertical component, and wherein a horizontal moving speed of said workpiece is set so that surface molecular density of said monomolecular film is kept constant during the building-up step.

3. A method according to claim 2, wherein said horizontal moving speed of the workpiece is set such that the workpiece is moved through the developing region by an area corresponding to the number of molecules of the monomolecular film built up on the build-up surface of the work per unit time by the vertical movement of the work.

4. A method according to claim 3, wherein a building-up ratio is calculated from a ratio of the amount of molecules built up on the build-up surface of the workpiece per unit time to an area of the build-up surface passing through the developing region when the workpiece is vertically moved at a predetermined vertical moving speed, and the horizontal moving speed of the workpiece is determined by multiplying the calculated building-up ratio with the predetermined vertical moving speed.

5. A method according to claim 1, which further comprises a step of preventing the molecules from flowing into that region of the developing region through which the workpiece has passed, and wherein a building-up step is performed simultaneous with a flow-in preventing step.

6. A method according to claim 5, wherein the flow-in preventing step includes defining the developing region so as to have substantially the same width as that of the work, and partitioning the defined developing region into a front region ahead of the build-up surface and a rear region behind the build-up surface by the workpiece.

7. A method according to claim 1, wherein building-up is performed while the build-up surface of the workpiece is located perpendicular to the developing region.

8. A method of manufacturing a multi-layered organic thin film comprising the steps of:
    preparing a liquid surface for forming a developing region in which a monomolecular film of organic molecules can be developed;
    developing a monomolecular film of organic molecules in the developing region;
    compressing the developed monomolecular film to a predetermined surface pressure;
    supporting a workpiece so that a build-up surface of the workpiece is inclined at a predetermined angle to the developed monomolecular film; and
    moving the workpiece through the developed monomolecular film in a direction inclined to the developed monomolecular film that includes a directional component which is perpendicular to the build-up surface and directed ahead thereof, thereby building up the monomolecular film on the build-up surface.

9. A method according to claim 8, wherein a contact angle between said build-up surface and the liquid surface is given as $\theta$ and said inclination angle of the build-up surface is set to be $180° - \theta$.

* * * * *